United States Patent
Uno

(10) Patent No.: US 8,428,361 B2
(45) Date of Patent: Apr. 23, 2013

(54) IMAGE PROCESSING APPARATUS FOR DETECTING A FACE

(75) Inventor: Takanori Uno, Kagoshima (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 12/978,235

(22) Filed: Dec. 23, 2010

(65) Prior Publication Data

US 2011/0158537 A1 Jun. 30, 2011

(30) Foreign Application Priority Data

Dec. 24, 2009 (JP) ................................. 2009-291960

(51) Int. Cl.
*G06K 9/46* (2006.01)
(52) U.S. Cl.
USPC .......................................... 382/190; 382/103
(58) Field of Classification Search .................. None
See application file for complete search history.

(56) References Cited

U.S. PATENT DOCUMENTS

2008/0298637 A1* 12/2008 Hu et al. ....................... 382/103
2008/0310726 A1* 12/2008 Kawada ........................ 382/190

FOREIGN PATENT DOCUMENTS

JP 2009-032018 2/2009

OTHER PUBLICATIONS

M. Saquib Sarfraz and Olaf Hellwich, "Head Pose Estimation in Face Recognition Across Pose Scenarios", 2008, International Conference on Computer Vision Theory and Applications, pp. 235-242.*

* cited by examiner

*Primary Examiner* — Andrew W Johns
*Assistant Examiner* — Siamak Harandi
(74) *Attorney, Agent, or Firm* — Kilpatrick Townsend & Stockton LLP

(57) ABSTRACT

An electronic image is received by a system to process the image for the presence of a face. The image is repeatedly electronically scanned using a plurality of windows for the presence of facial poses. A plurality of directional poses is detected during the scanning process. Reliabilities for each type of detected poses are calculated. The reliabilities are based on the amount of times the directional poses are detected during the scanning process and directions of the directional poses.

20 Claims, 18 Drawing Sheets

IMAGE PROCESSING APPARATUS FOR DETECTING A FACE

This application claims priority to Japanese Patent Application No. 2009-291960, filed Dec. 24, 2009, the entirety of which is incorporated by reference herein.

BACKGROUND

The present invention relates to an image processing apparatus capable of detecting a face from an image.

Regarding detecting human faces in an image, there has been known a technique regarding a face detection system, which performs learning on the basis of a plurality of sample image data, to determine and detect whether or not an image region within a detection window set in the image is a face region (refer to JP-A-2009-32018).

In the photographed image, faces in various poses may exist. For example, the photographed image may capture not only faces (frontal faces) which are directed to the front or substantially to the front but also faces (profile faces) which are turned by a certain degree in the horizontal direction and faces (tilted faces) for which the lengthwise directions are tilted with respect to the image. In such a situation, when the faces turned to various directions are intended to be detected, two methods are mainly used. The first method detects faces (the faces and the poses thereof) from the inside of the image by use of a single face detector which learns on the basis of an enormous volume of sample image data so as to be able to detect faces in all poses. The second method provides a face detector (a frontal face detector), which learns only frontal face detection, another detector (a profile face detector), which learns only profile face detection, and the like and individually applies the frontal face detector and the profile face detector to the image.

In the first method, it is difficult to generate one face detector capable of accurately detecting the poses of faces in all poses. Hence, problems arise in low detection accuracy and slow detection speed. Therefore, the second method is employed in order to solve the problems of the corresponding first method. However, in the second method, it is problematic that a plurality of detection results can be generated from one face. Specifically, when the frontal face detector is used for the person's face captured in an image, one face may be detected (a frontal face), and when the profile face detector is used therefor, another face may be also detected (a profile face). That is, if poses of a plurality of faces are detected, it is problematic as to which detection result is correct and should be adopted.

SUMMARY

An advantage of the invention is to provide an image processing apparatus capable of appropriately determining which pose is correct when a plurality of poses is detected from the same face so as to thereby contribute to high accuracy and fast face detection.

According to an aspect of the invention, an image processing apparatus includes: a detection section that performs a process of detecting an image of a face, which is turned to a predetermined direction, on poses of a plurality of faces by determining the presence/absence of the image of the face, which is turned to a predetermined direction, from the basis of image information within an input image; and a determination section that, when a pose overlap region in which the face images of the plurality of face poses are multiply detected by the detection section is generated, calculates reliabilities of the detection results for each pose of the face images detected in the pose overlap region and determines the pose of the face images which reside in the pose overlap region depending on the comparison result of the respective calculated reliabilities.

In the aspect of the invention, reliabilities of the detection results are calculated for each pose of the face images detected in the pose overlap region, the respective reliabilities are compared, and a pose of a higher reliability is determined as the pose of the face images which reside in the pose overlap region. Hence, when a plurality of poses is detected from the same face, it is possible to appropriately determine which pose is correct. As a result, the pose of face is determined fast with a high accuracy as compared with the related art.

The detection section may repeatedly perform a process of setting detection windows within the input image for each target pose of the plurality of faces and determining the presence/absence of a face image with the target pose on the basis of image information within the detection window by changing the detection window, and the determination section may calculate reliabilities on the basis of the number of times the face images are detected in the pose overlap region, for each pose of the face images detected in the pose overlap region. With such a configuration, it is possible to appropriately calculate the reliabilities of the detection results for each pose of the face images detected in the pose overlap region on the basis of a numerical value of the number of detections for each pose.

Furthermore, the determination section may calculate the reliabilities of the detection results for each pose of the face images detected in the pose overlap region by respectively correcting the number of detections of the face image in the pose overlap region for each pose of face images detected in the pose overlap region with predetermined correction coefficients corresponding to the poses of the face images. With such a configuration, where it is difficult to compare priorities of the detection results detected for each pose in a simple comparison of the numbers of times detected for each pose, it is possible to calculate more appropriate reliabilities by use of comparison.

In the course of repeatedly performing the process of determining the presence/absence of the face image by changing the detection window, the detection section may exclude a region in which the number of times that the face image can be detected exceeds a predetermined threshold from the detection window setting target, for the detection of the face images which correspond to the one corresponding face pose and other face poses. With such a configuration, when the face image corresponding to the one face pose can be detected many times to some extent that the face image is reliably present in the region including the input image, then the process of detecting the face image is suspended. Hence, it is possible to reduce the processing load of the image processing apparatus.

The detection section may be able to respectively detect an image of a face which is directed substantially to the front and an image of a face which is turned from the frontal pose. Furthermore, the detection section may be able to respectively detect a face image of a pose which is upright (not tilted) with respect to the input image and a face image of a pose which is tilted with respect to the input image. With such a configuration, in the case of detecting one face image as a frontal face and detecting the face image as a profile face, or in the case of detecting the face image as a frontal face and detecting the face image as a tilted face, it is possible to appropriately determine the pose of the face image on the basis of the reliabilities based on the detection results of the respective poses.

The determination section may change a correspondence relationship between the pose of the face image and the correction coefficient depending on whether the input image is a still image or a moving image. According to the corresponding configuration, for example, when the input image is a still image, it is possible to make the detected face image be easily determined as a frontal face. In addition, when the input image is a moving image, it is possible to make the detected face image be easily determined as a profile face.

When the calculated reliabilities are the same, the determination section may determine the pose of the face image which resides in the pose overlap region on the basis of the predetermined priority between the poses of the face. With such a configuration, even when the calculated reliabilities are the same, it is possible to appropriately and finally determine the pose of the face image which resides in the pose overlap region. The priority between the poses of the face may be set to be changed depending on, for example, whether the input image is a still image or a moving image.

The technical idea of the invention can be realized by means other than the image processing apparatus. For example, the idea can be realized as a method of providing the processing processes which are performed by the respective parts of the above-mentioned image processing apparatus, and a program causing a prescribed hardware (such as a computer built in an image processing apparatus) to execute the functions which are performed by the respective parts of the above-mentioned image processing apparatus. Further, the image processing apparatus may be a single apparatus, and may be a system formed of a plurality of devices.

BRIEF DESCRIPTION OF THE DRAWINGS

The invention will be described with reference to the accompanying drawings.

DETAILED DESCRIPTION

Figure 1:
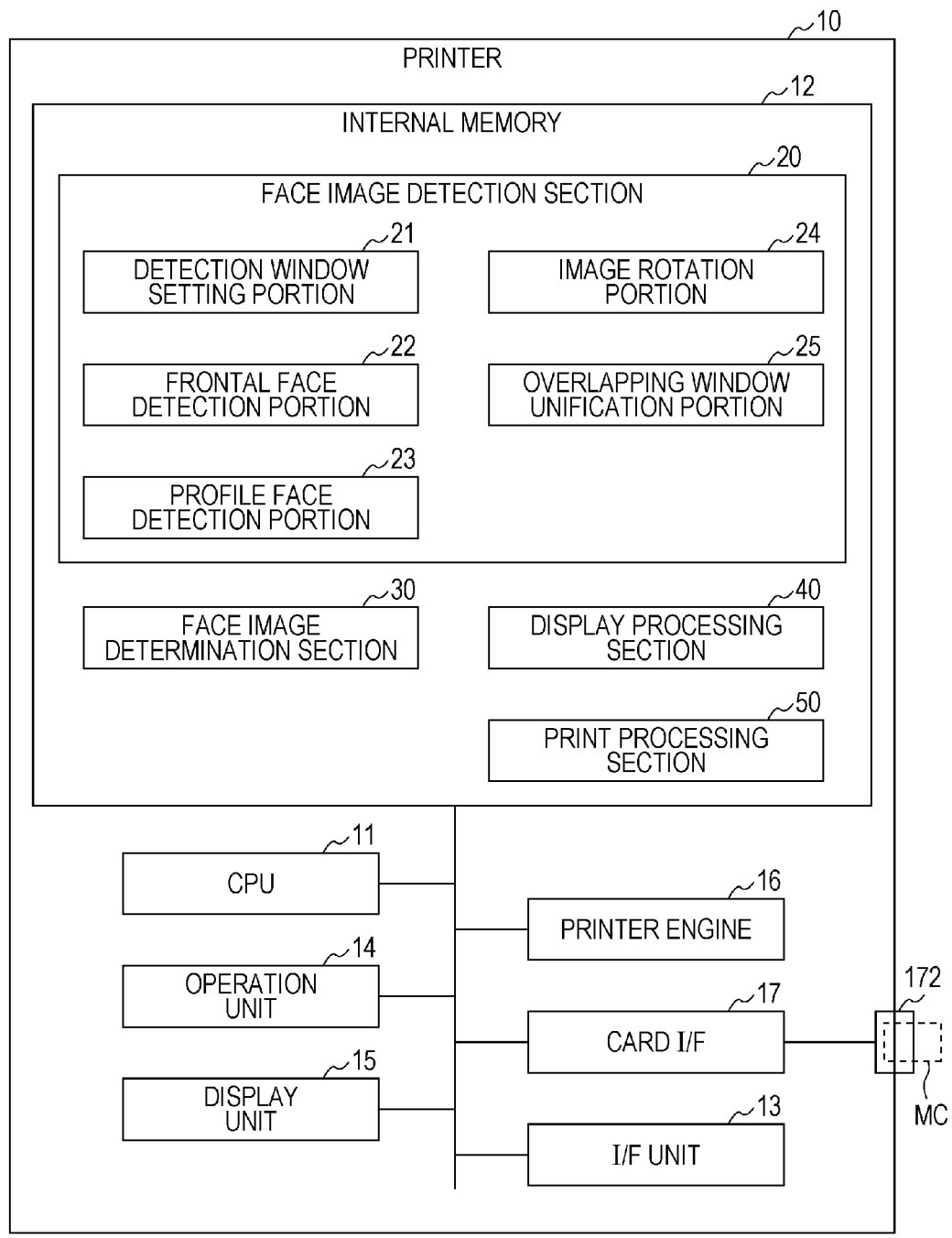
FIG. 1 is a block diagram illustrating a schematic configuration of an example of an image processing apparatus.

Schematic Configuration of Image Processing Apparatus:

FIG. 1 schematically shows a configuration of a printer 10 as an example of an image processing apparatus according to an embodiment of the invention. The printer 10 prints an image on the basis of image data which is acquired from a computer readable storage medium (for example, a memory card MC or the like), and supports so-called direct printing. The printer 10 is provided with: a CPU 11 which controls respective units of the printer 10; an internal memory 12 which includes, for example, a ROM and a RAM; an operation unit 14 which includes buttons or a touch panel; a display unit 15 which includes a liquid crystal display; a printer engine 16; a card interface (card I/F) 17; and an I/F unit 13 which connects with external devices such as a personal computer (PC), a server, a digital still camera, and a scanner. The components of the printer 10 are interconnected through a bus.

The print engine 16 is a printing mechanism which performs a printing operation on the basis of print data. The card I/F 17 is an I/F used for exchanging data with the memory card MC which is inserted into a card slot 172. In the memory card MC, image data is stored, and the printer 10 can receive an input of the image data, which is stored in the memory card MC, through the card I/F 17. As a storage medium used for providing the image data, various media other than the memory card MC can be used. The printer 10 is able to receive the image data as an input from the external devices, which are connected thereto through the I/F unit 13, other than the storage medium. The printer 10 may receive the print data as an input from a PC or a server which is connected through the I/F unit 13.

The internal memory 12 contains a face image detection section 20, a face image determination section 30, a display processing section 40 and a print processing section 50. The face image detection section 20 and the face image determination section 30 are computer programs which are used for performing a face image detection/determination process, which will be described further under a prescribed operating system. The display processing section 40 is a display driver which displays the processing menu, or the message on the display unit 15 by controlling the display unit 15. The print processing section 50 is a computer program used for generating the print data from the image data, and printing an image based on the print data by controlling the printer engine 16. The CPU 11 reads the programs from the internal memory 12, and executes the programs, thereby implementing functions of the respective sections.

The face image detection section 20 includes: a detection window setting portion 21 as a program module; a frontal face detection portion (frontal face detector) 22; a profile face detection portion (profile face detector) 23; an image rotation portion 24; and an overlapping window unification portion 25. The functions of the respective portions will be described elsewhere The face image detection section 20 performs a process of detecting an image of a face, which is turned to a predetermined direction, from poses of a plurality of faces by determining the presence/absence of the image of the face based on image information within an input image. Further, the face image determination section 30, when a pose overlap region (in which the face images of the plurality of face poses are multiply detected by the detection section) is generated, calculates reliabilities of the detection results for each pose of the face images detected in the pose overlap region, and determines the pose of the face images which reside in the pose overlap region depending on the comparison result of the respective calculated reliabilities. The printer 10 may be a printing apparatus intended for consumer use or may be an office printing apparatus intended for DPE use (so-called minilab machine). Further, the printer 10 may be a multifunction peripheral which also has various other types of functions, such as a copy function and a scan function.

Figure 2:
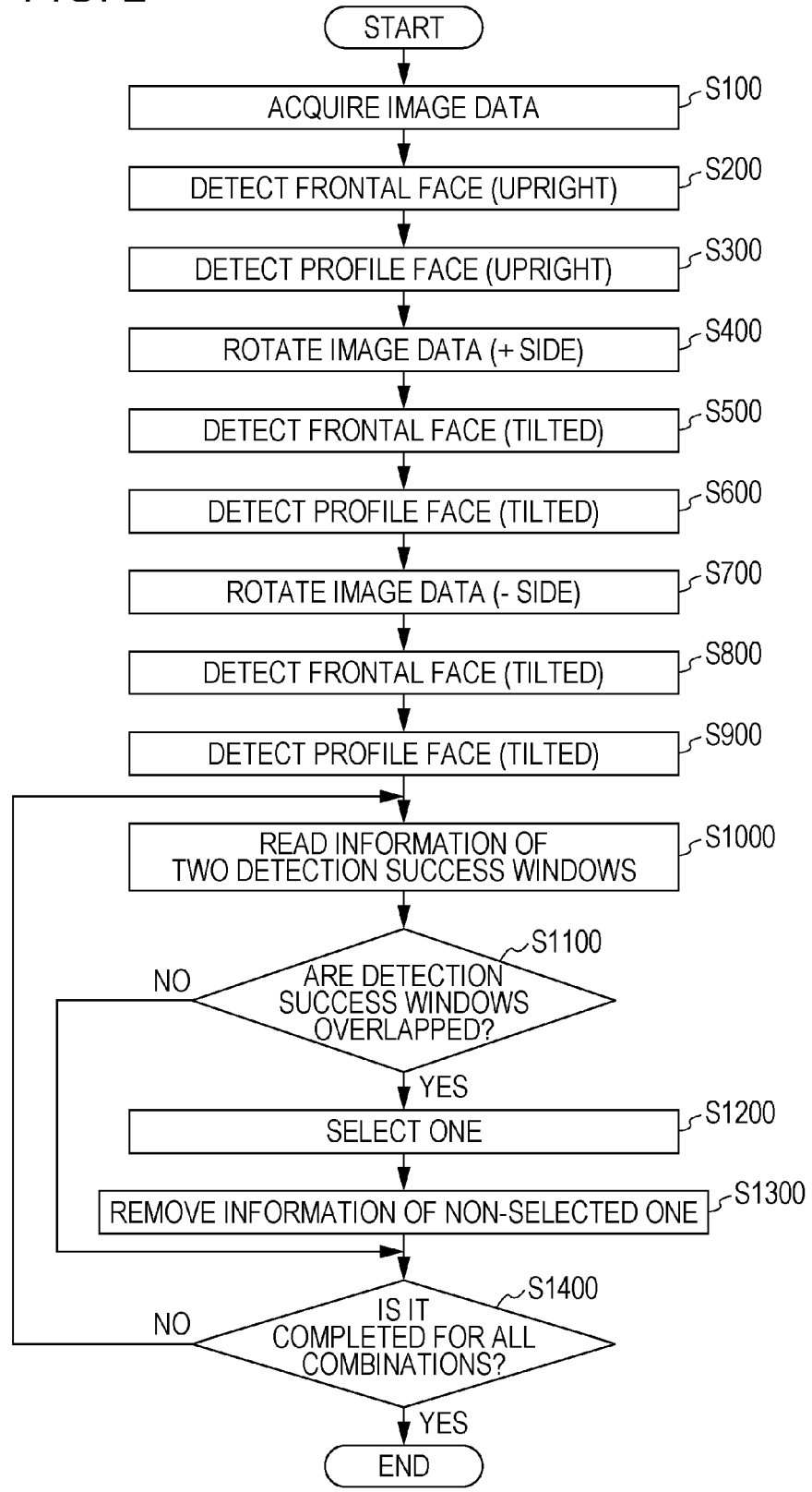
FIG. 2 is a flowchart illustrating a face image detection/determination process.

Face Image Detection/Determination Process:

FIG. 2 shows a face image detection/determination process, which is performed by the printer 10, via a flowchart. In S100, the face image detection section 20 acquires image data D, which represents an image (the input image) as an image processing target, from the prescribed storage medium such as the memory card MC. The input image described herein is a still image. When the printer 10 includes a hard disk drive (HDD), the face image detection section 20 acquires the image data D stored in the corresponding HDD, and can also acquire the image data D from the external devices connected therewith through the I/F unit 13 as described above. The image data D is bitmap data generated from a plurality of pixels. For example, each pixel can be represented by a combination of gray levels (for example, 256 gray levels ranging from 0 to 255) of each RGB channel.

Figure 3:
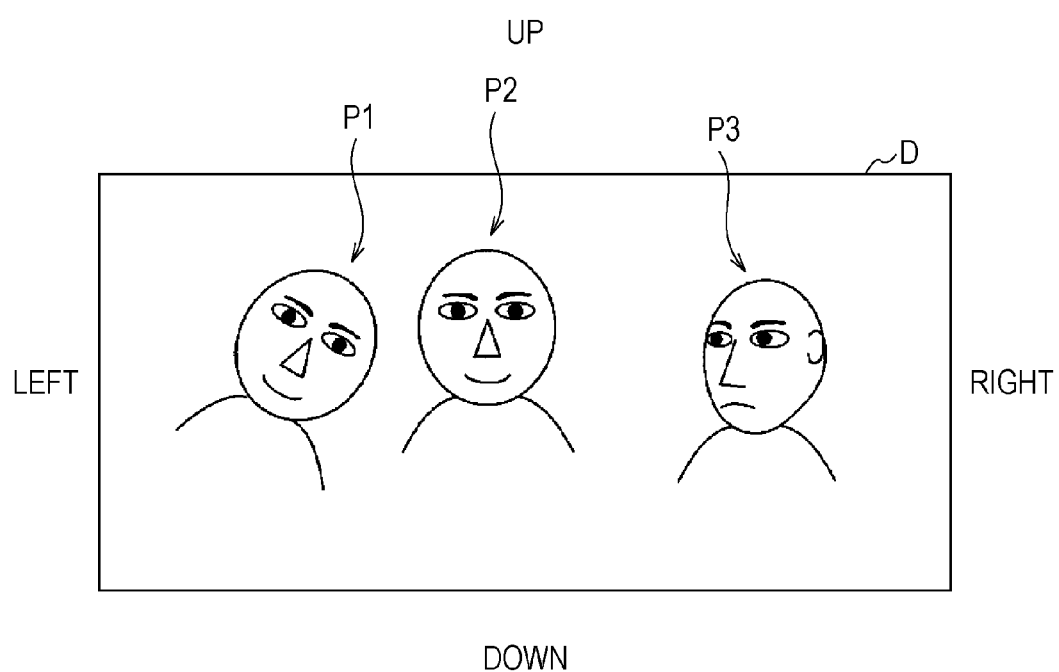
FIG. 3 is a diagram illustrating an example of image data.

FIG. 3 shows an example of the image data D. In the image data D according to the example, human faces P1, P2, and P3 are captured. Here, the face P1 is a frontal face which is directed substantially to the front, but the lengthwise direction of the face is tilted with respect to the vertical direction of the image data D. The face P2 is an upright frontal face. The face P3 is upright, but is a profile face (a side face) where the entire face is turned to the left side (the left side in the image) in the image data D.

In S200, the face image detection section 20 performs the frontal face detection process on the image data D. In addition, when the process during and after S200 is performed on the image data D with the input image size, the processing load of the printer 10 may be excessively increased. This can be presented by reducing the image size, for example, by allowing the face image detection section 20 to reduce the number of pixels in the image data D, and the process during and after S200 may be performed on the reduced image data. The reduced image data is also represented as the image data D for the sake of convenience.

Figure 4:
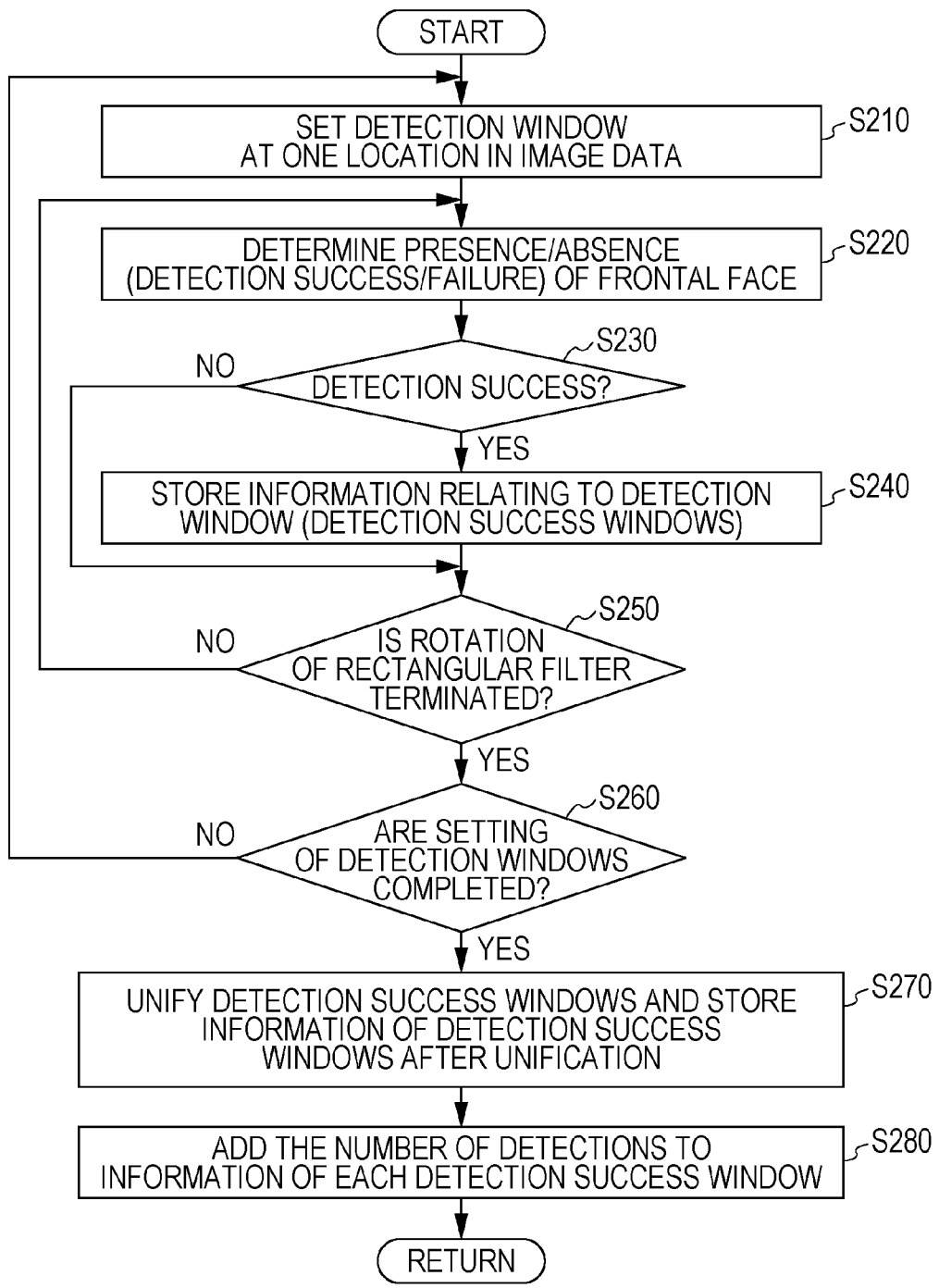
FIG. 4 is a flowchart illustrating details of a frontal face detection process.

FIG. 4 details S200 (the frontal face detection process) in a flowchart. In S210, the detection window setting portion 21 sets one detection window SW in the image data D. The detection window setting portion 21 sets the detection window SW as described in the following example.

Figure 5:
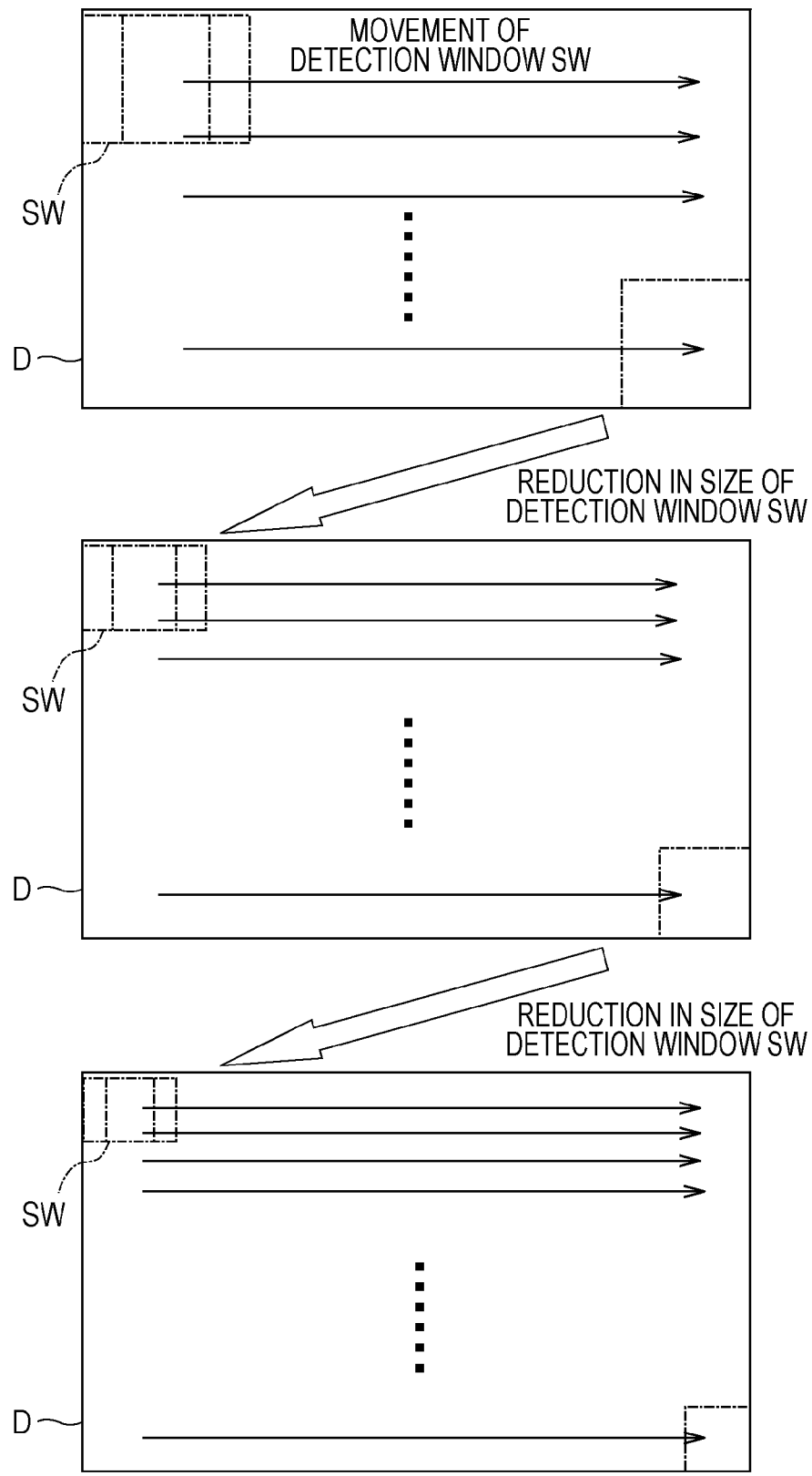
FIG. 5 is a diagram illustrating a setting of a detection window in the image data.

FIG. 5 shows a condition in which the detection window SW is set in the image data D. In the first execution of S210, the detection window setting portion 21 sets the rectangular detection window SW (the chain double-dashed line), which includes a plurality of pixels and has a predetermined size, at a beginning position (for example, the left top corner position of the image) within the image. In the second execution of S210, the detection window setting portion 21 moves the detection window SW in a horizontal direction and/or a vertical direction by a predetermined distance (by a predetermined number of pixels). Then, the detection window setting portion 21 sets a new detection window SW at the moved position. The detection window setting portion 21 repeatedly sets the detection window SW while moving the detection window SW centrally to a last position (for example, the right bottom corner position of the image) of the image data D, where the size of the detection window SW is maintained, and then sets the detection window SW back to the beginning position.

When the detection window SW is returned to the beginning position, the detection window setting portion 21 reduces the detection window SW, i.e., the rectangle is reduced in size. Then, in the same manner as described above, the detection window setting portion 21 sets the detection window SW at each position while moving the detection window SW to the last position of the image data D, during which the reduced size of the detection window SW is maintained. The detection window setting portion 21 repeats the movement and the setting of the detection window SW (repeats the change of the detection window SW) for further reduced sizes of the detection window SW in a stepwise fashion for a predetermined amount of times. As described above, when one detection window SW is set in S210, the process during and after S220 is performed.

In S220, the frontal face detection portion 22 determines the presence/absence of the frontal face on the basis of the image information in the latest detection window SW which is set in S210.

Figure 6:
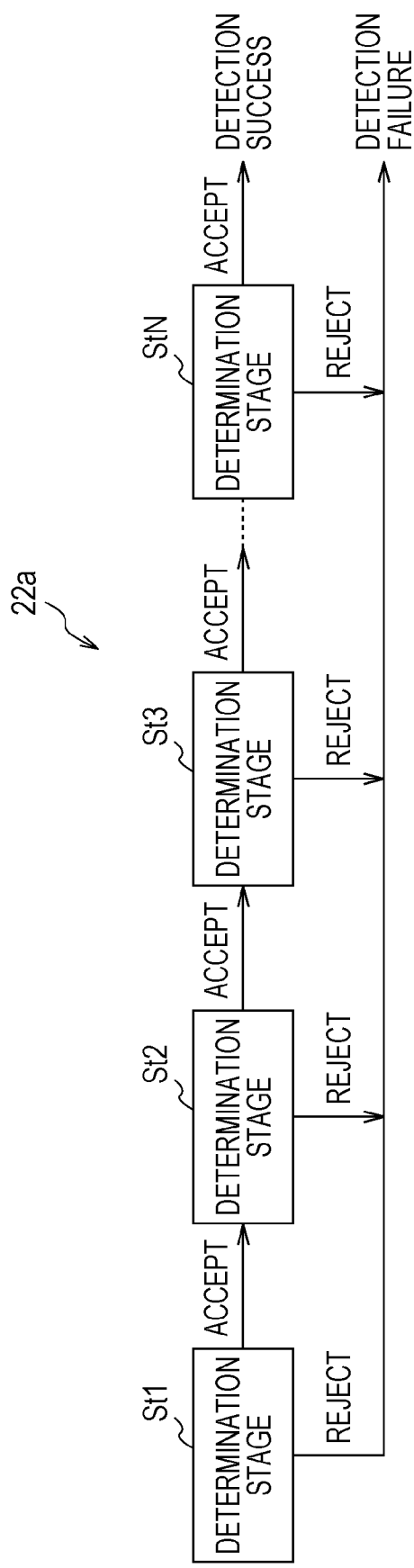
FIG. 6 is a diagram illustrating an example of a frontal face detector.

FIG. 6 is a diagram illustrating a frontal face detector 22a used by the frontal face detection portion 22. The frontal face detector 22a has a plurality of (N) determination stages St1 to StN connected in series. In each determination stage St, based on the result obtained by applying one or more rectangular filters F to the image within the detection window SW, "Accept", (i.e., a value that the frontal face is present) or "Reject" (i.e., a value to the effect that the frontal face is absent) is output as the determination result. During the first determination stage St1, only when "Accept" is output, the determination in the next determination stage St2 is performed. Also during and after the determination stage St2, only when "Accept" is output, the process advances to the next determination stage St. In the last determination stage StN, when "Accept" is output, the frontal face detector 22a determines that a frontal face is present in the detection window SW (detection success of a frontal face). On the other hand, when "Reject" is output in several determination stages St, the frontal face detector 22a determines that a frontal face is absent in the detection window SW (detection failure of a frontal face).

Figure 7:
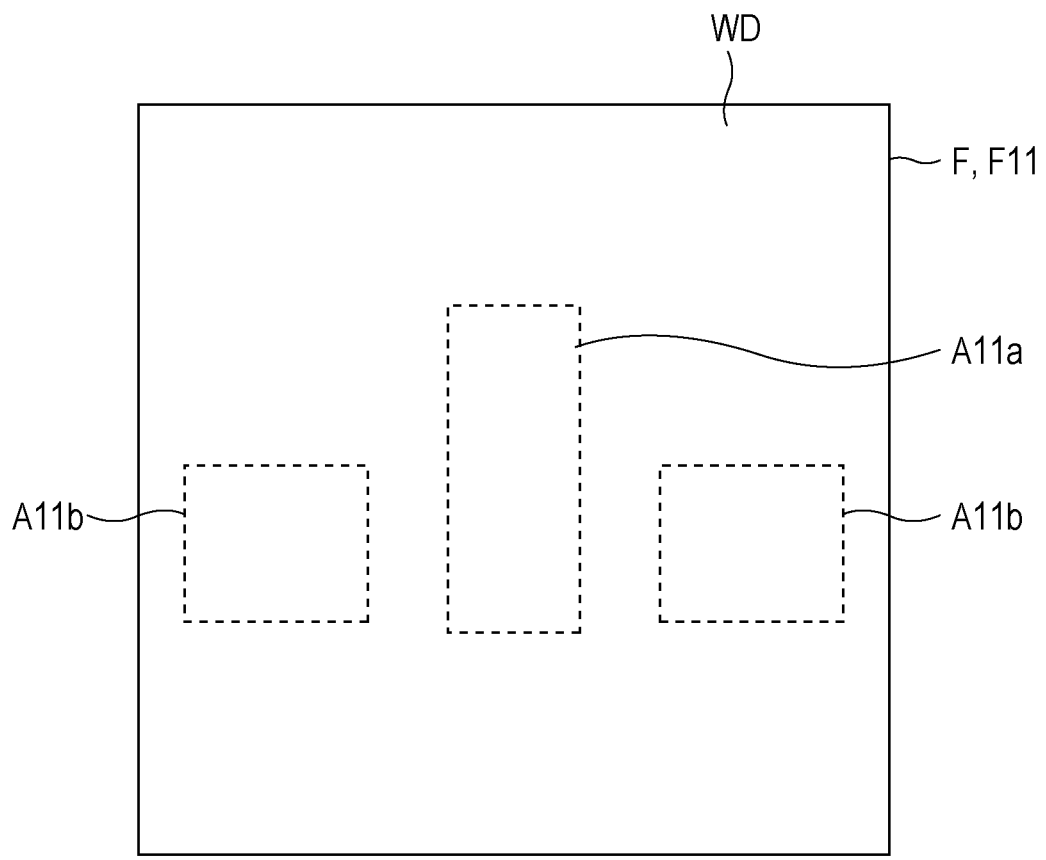
FIG. 7 is a diagram illustrating an example of a condition in which a rectangular filter is applied to the image within the detection window.

FIG. 7 shows an example of a condition in which the rectangular filter F11 provided in advance is applied to the image within the detection window SW in the determination stage St1. Here, the image within the detection window SW is represented as image data WD. In FIG. 7, the rectangular filter F11 (a kind of the rectangular filter F) is superimposed on the image data WD. The image data WD and the rectangular filter F11 have a square shape with the same size. In the rectangular filter F11, the regions A11a and A11b for extracting an amount of characteristic of the image are set. If the image data WD on which the rectangular filter F11 is superimposed includes a frontal face, the region A11a is set to the range in which it is estimated that the nose of the corresponding face is present. In addition, if the image data WD on which the rectangular filter F11 is superimposed includes a frontal face, the regions A11b are set to the ranges in which it is estimated that the right and left cheeks of the corresponding face are present. When the rectangular filter F11 is superimposed on the image data WD, the frontal face detector 22a calculates the summation Ysum1 of the brightness of the pixels in the region A11a, and calculates the summation Ysum2 of the brightness of the pixels within the regions A11b. Then, if a difference E (an absolute value) between both summations is equal to or more than a predetermined threshold Th11, the frontal face is highly likely to be present, and thus a value U11 is output as the result (a filter determination value) obtained by applying the rectangular filter F11. In contrast, if the corresponding difference E of both summations is less than a predetermined threshold Th11, the frontal face is less likely to be present, and thus a value V11 is output as the filter determination value. Here, U11>V11. All of the thresholds Th11 and the values U11 and V11 are predetermined values which are set in advance so as to correspond to the rectangular filter F11.

In the determination stage St1, similarly to the case where the rectangular filter F11 is applied by using the plurality of rectangular filters F provided in advance in addition to the rectangular filter F11, the respective rectangular filters F are applied to the image data WD, thereby acquiring the filter determination values of the respective rectangular filters F. The regions (corresponding to the regions A11a and A11b) for extracting the amount of image characteristics are mutually different in position and size between the respective rectangular filters F. Thus, the thresholds, which are used in the comparison of the difference E and the like, and the filter determination values as outputs may be not the same. In addition, in the determination stage St1, the summation of the respective filter determination values, which can be obtained as results by applying the respective rectangular filters F, is calculated. Then, if the summation of the filter determination values is equal to or more than the predetermined threshold which is set in advance in the determination stage St1, "Accept" is output. In contrast, if the summation of the filter determination values is smaller than the threshold which is set in advance in the determination stage St1, "Reject" is output. Likewise, also in the following determination stages St2 to StN, the threshold determination is performed on the summation of the filter determination values by use of the plurality of rectangular filters F provided for each stage, thereby outputting "Accept" or "Reject". It is apparent that the number and the contents of the used rectangular filters F and the thresholds for comparing with the summation of the filter determination values may be different for each determination stage. Specifically, in the image processing apparatus of the embodiment, the frontal face detector 22a is provided in advance. The frontal face detector 22a performs learning on the basis of the plurality of sample image data generated from the frontal face image, the near frontal face image, and other face images, thereby optimizing the rectangular filters F, the thresholds, the filter determination values, and the like.

In S230, the frontal face detection portion 22 branches the process in accordance with the determination result of the previous S220. That is, if the detection of a frontal face is successful in the previous S220, the process advances to S240. In contrast, if the detection of a frontal face fails in the previous S220, the process advances to S250.

In S240, the frontal face detection portion 22 stores information, which relates to the detection window SW (the detection window SW which succeeds in detection of the face image) set in the previous S210, in a predetermined region of the internal memory 12. Here, the stored information includes the position of detection window SW (for example, the center coordinates of the detection window SW in the image data D), the size of the rectangle of the detection window SW, the pose of the face image which resides (is certain to reside) in the detection window SW, the rotation angle of the rectangular filter F, and the like. Hereinafter, the detection window SW, which succeeds in detection of the face image, is also referred to as a detection success window SSW.

It should be understood that, "the pose of the face (the face image)" includes the "profile" of the face and the "tilt" of the face. The "profile" of the face includes profiles which are turned to the horizontal direction (refer to the face P3 of FIG. 3) and the vertical direction, and thus means a situation in which the face is turned to any of the up, down, right, or left side from the frontal pose (no profile) as a reference. The "tilt" of the face means the tilt (refer to the face P1 of FIG. 3) of the lengthwise direction of the face with respect to the vertical direction of the image data D or the horizontal direction of the image data D. In the corresponding S200 (the frontal face detection process), the face image is detected as a frontal face which is upright, and thus information to the effect that there is no profile to the face and uprightness of the face is stored as "the pose of the face image".

"The rotation angle of the rectangular filter F" is a rotation angle which is formed by rotating the rectangular filter F when the frontal face detector 22a superimposes the rectangular filter F on the image of the detection window SW in S220, and is any one of 0° (no rotation), 90°, 180°, and 270°. The rotation angle of the rectangular filter F is common in the first S220. In the above description of S220, since the rectangular filter F is not rotated, (S230 interlaid in between) in the next S240, the rotation angle of the rectangular filter F is stored as "0°". In the current S200 (the frontal face detection process), the process of S220 to S240 is repeatedly performed on the first set detection window SW the number of times (four times) corresponding to the number of the rotation angles of the rectangular filter F (refer to S250). That is, in the second S220, each rectangular filter F is rotated by 90° with reference to 0°, and is then applied to the next detection window SW. In the third S220, each rectangular filter F is rotated by 180° with reference to 0°, and is then applied to the next detection window SW. In the fourth S220, each rectangular filter F is rotated by 270° with reference to 0°, and is then applied to the next detection window SW. In such a manner, even when the upper side of the face within the detection window SW is directed toward any of the top, bottom, left, and right side of the detection window SW, it is possible to detect a face within the detection window SW.

In S260, with regard to setting the detection window SW described by use of FIG. 5, the detection window setting portion 21 may still have another cycle of setting the detection window SW by moving the detection window SW and further reducing the size thereof. In this case, the process returns to S210, and one detection window SW is newly set in the image data D. On the other hand, if setting the detection window SW by repeatedly reducing the detection window SW a predetermined number of times is completed, the process advances to S270.

In S270, if the detection success windows SSW which can be obtained from the image data D through the process of S210 to S260 performed hitherto overlap with each other, the overlapping window unification portion 25 unifies the overlapped detection success windows SSW. The overlapping window unification portion 25 specifies and unifies the detection success windows SSW overlapping in the image data D with reference to the information (the positions and sizes of the detection success windows SSW) stored in the internal memory 12 in S240 mentioned above.

Figure 8:
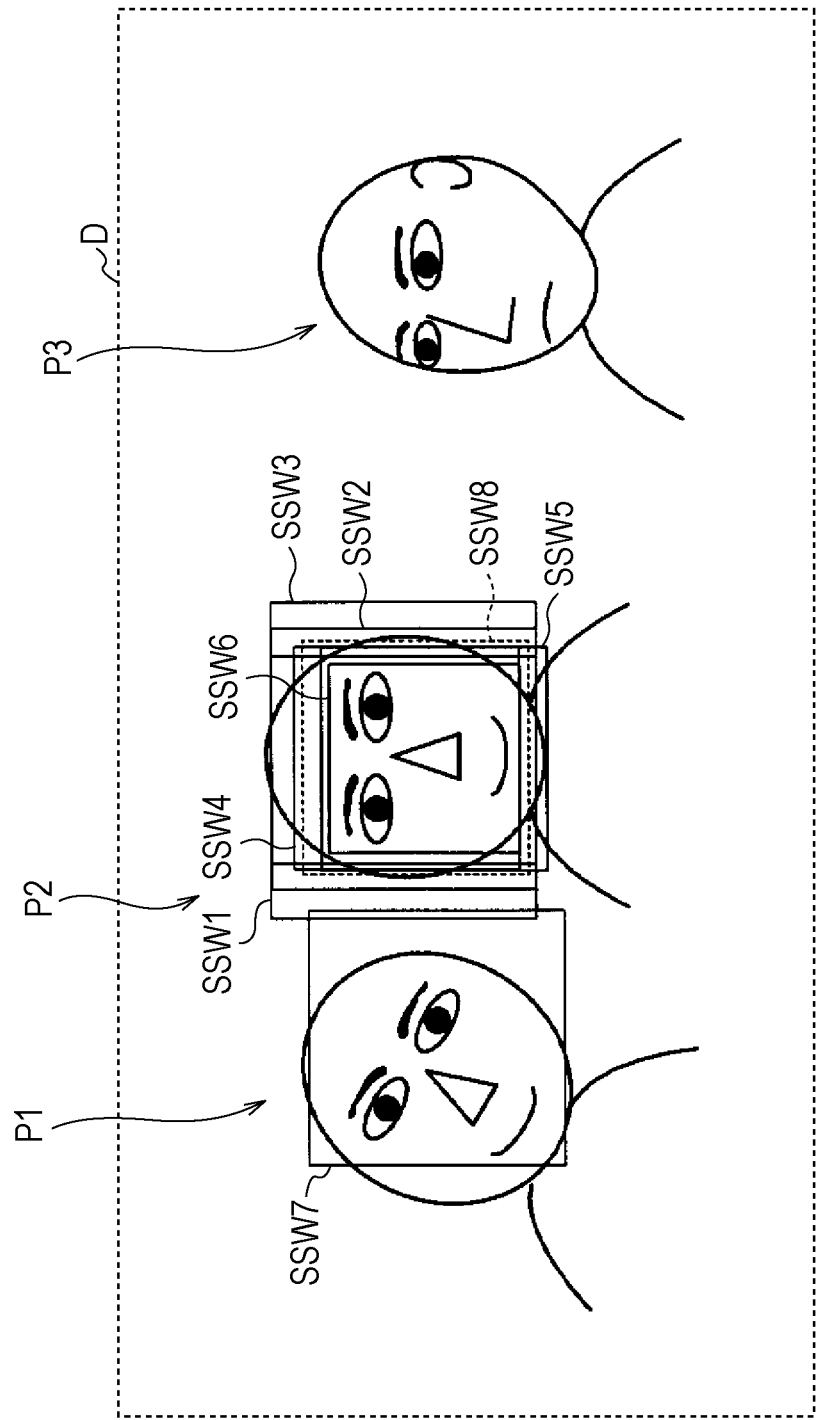
FIG. 8 is a diagram illustrating an example of a detection success window which is stored as a result of the frontal face detection process.

FIG. 8 shows an example of a plurality of detection success windows SSW (the detection success windows SSW1 to SSW7) stored as windows which succeeded in detection of frontal faces, where the process of S210 to S260 is performed on the image data D. Here, FIG. 8 shows only a partial range of the image data D. As described above, the detection windows SW are repeatedly set while shifting in position by an amount of several pixels and changing in size in the image data D. Hence, as shown in FIG. 8, in the vicinity of the face P2 as an upright frontal face, the frontal face detection is successfully achieved by using a plurality of detection windows SW of which positions and sizes are slightly different from each other. The overlapping window unification portion 25 specifies a plurality of detection success windows SSW to be unified, among the plurality of detection success windows SSW, in accordance with a degree of the overlap. For example, when the overlapping window unification portion 25 sets one detection success window SSW as an attention window, there may be another detection success window SSW which overlaps with the attention window in an area of a predetermined percent (for example, about 70 percent) or more. In this case, the overlapping window unification portion 25 specifies the corresponding attention window and another detection success window SSW as unification targets.

The overlapping window unification portion 25 specifies a set of the detection success windows SSW as the unification target by sequentially setting all the detection success windows SSW, which can be obtained from the image data D, as the attention windows as described above. In the example of FIG. 8, the detection success windows SSW1 to SSW6 overlap with each other in a large area, and thus are specified as a set of unification targets. The detection success window SSW7 overlaps with a part of the detection success window SSW1, but the overlap area is small, and thus the detection success window SSW7 does not belong to the set of the unification targets. The detection success window SSW7 is stored as a detection success window SSW although there is no upright frontal face in practice (a tilted frontal face (the face P1) and the like are detected as the upright frontal faces). In other words, a region, in which more and more detection success windows SSW overlap with each other in the image data D, is determined more likely to include a face (here, an upright frontal face) which is set as the detection target in practice at that time.

The overlapping window unification portion 25 unifies the set of the detection success windows SSW (the detection success windows SSW1 to SSW6) which are specified as the unification targets, and thereby generates a new detection success window SSW. For example, the positions and the sizes of the respective detection success windows SSW1 to SSW6 constituting the corresponding set are averaged, and a rectangle having the averaged position and size is formed as a new detection success window SSW8. In FIG. 8, an example of the detection success window SSW8 is indicated by the chain line. The overlapping window unification portion 25 stores the information (the position, the size, the pose of the face image, and the rotation angle of the rectangular filter F), which relates to the detection success window SSW8, in the internal memory 12. In addition, the overlapping window unification portion 25 removes the information, which relates to the respective detection success windows SSW1 to SSW6 belonging to the set as a unification source of the detection success window SSW8, from the internal memory 12. The pose of the face image and the rotation angle of the rectangular filter F in the information on the detection success window SSW8 are the same as the poses of the face images (no profile of the face and uprightness of the face) and the rotation angles (0°) of the rectangular filters F of the detection success windows SSW1 to SSW6 formed as the unification source. In addition, it is convenient to think that the rotation angle of the rectangular filter F is common to the detection success windows SSW1 to SSW6 formed as the unification source.

In S280, as a result of the process of S210 to S270, currently, the face image detection section 20 adds the number of detections (successes) Vfe to the information on the detection window SW (the detection success window SSW) stored in the internal memory 12. Here, the number of detections Vfe=1 is given to each detection success window SSW (in the example of FIG. 8, the detection success window SSW7) which is not determined as a unification target in S270. In contrast, the number of detections Vfe corresponding to the number of the detection success windows SSW formed as the unification source, is added to the information of each detection success window SSW generated by the unification in S270 (regarding the detection success window SSW8 generated by unifying the detection success windows SSW1 to SSW6, the number of detections Vfe thereof is equal to 6). It is not necessary to perform the additional process of giving the number of detections Vfe in S280, and the process may be performed in S240 and/or S270 instead. As a result of the process of S210 to S260, if the detection success windows SSW overlapping with each other are absent, the process of S270 is not performed. In addition, as a result of the process of S210 to S260, if all of the detection success windows SSW are absent, the process of S270 and the process of giving the number of detections are not performed (hereinafter the same). Accordingly, the process of S200 (the frontal face detection process) is terminated.

In S300 (FIG. 2), the face image detection section 20 performs a profile face detection process on the image data D.

Figure 9:
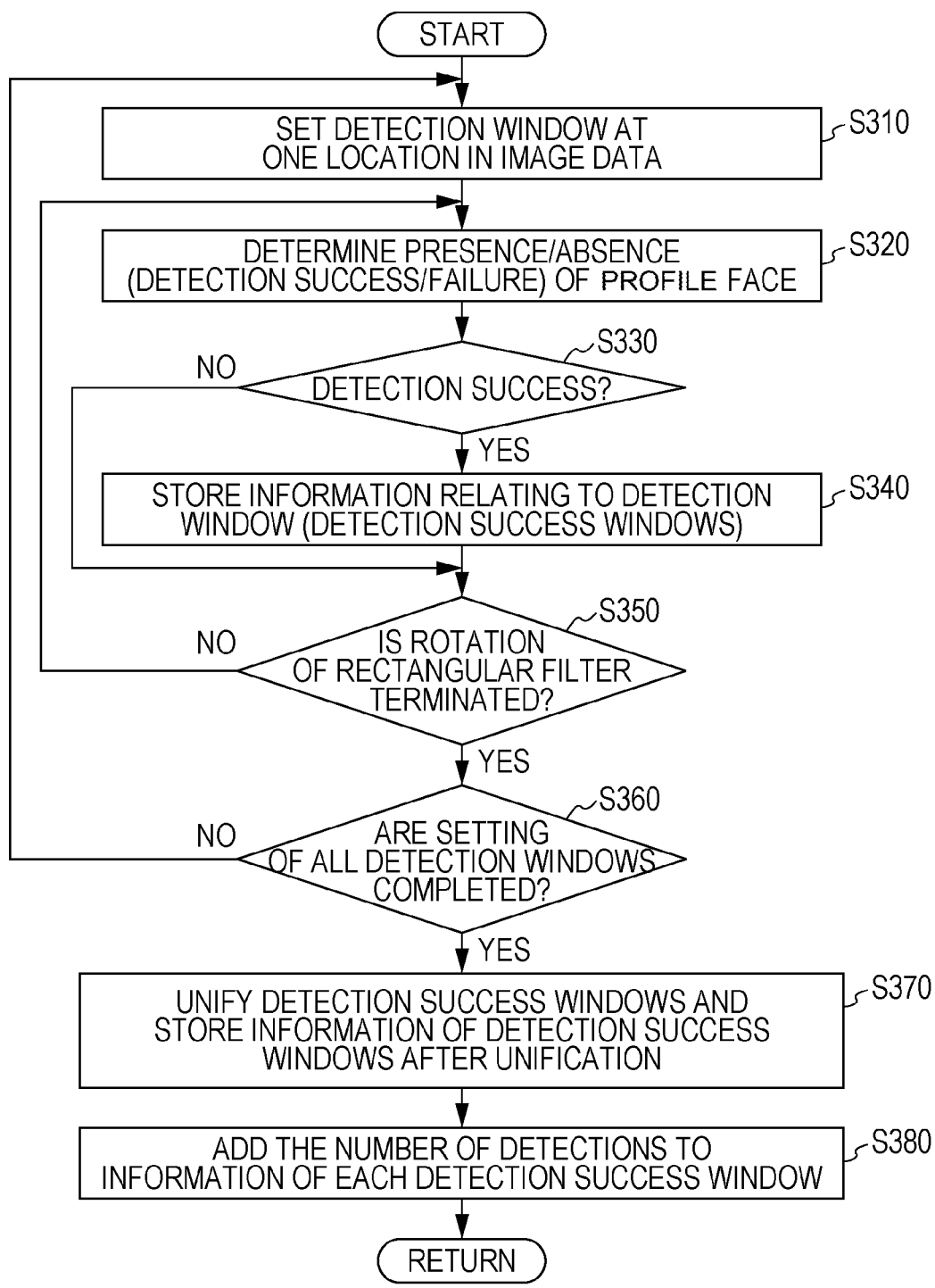
FIG. 9 is a flowchart illustrating details of a profile face detection process.

FIG. 9 shows a flowchart of a profile face detection process S300. The profile face detection process S300 is different from the process of S200 in that the face image as a detection target is a profile face which is turned in the horizontal direction (to the left side or the right side). However, the basic process flow is the same as described with regards to the process of S200 (FIG. 4). S310 is largely the same as S210. In S320, the profile face detection portion 23 determines the presence/absence of a horizontal profile face on the basis of the image information in the latest detection window SW which is set in S310. Specifically, in the image processing apparatus of the embodiment, similarly to where the frontal face detector 22*a* is provided, a profile face detector is provided. The profile face detector is formed of respective determination stages of performing learning on the basis of a plurality of sample image data generated from the image of a horizontal profile face and other face images so as to thereby optimize the rectangular filters F, the thresholds, the filter determination values, and the like. In addition, the profile face detection portion 23 determines the presence/absence (success/failure of detection of the profile face) of the horizontal profile face in the detection window SW by using the profile face detector.

In S330, similarly to S230, the profile face detection portion 23, branches the process in accordance with the determination result of S320. If the detection of a profile face was successful in the previous S320, the process advances to S340. In contrast, if the detection of a profile face failed in the previous S320, the process advances to S350. In S340, similarly to S240 the profile face detection portion 23 stores information (the position, size, pose of a face image and the rotation angle of the rectangular filter F), which relates to the detection window SW (the detection success window SSW) set in S310, in a predetermined region of the internal memory 12. In the corresponding S300 (the profile face detection process), the face image is detected as an upright profile face which is turned horizontally, and thus information to the effect that the profile (the horizontal profile) of a face is present and uprightness of the face is stored as "the pose of the face image". S350 and S360 are largely the same as the S250 and S260. In S370, similarly to S270, if the detection success windows SSW obtained from the image data D through S310 to S360 overlap with each other, the overlapping window unification portion 25 unifies the overlapped detection success windows SSW.

Figure 10:
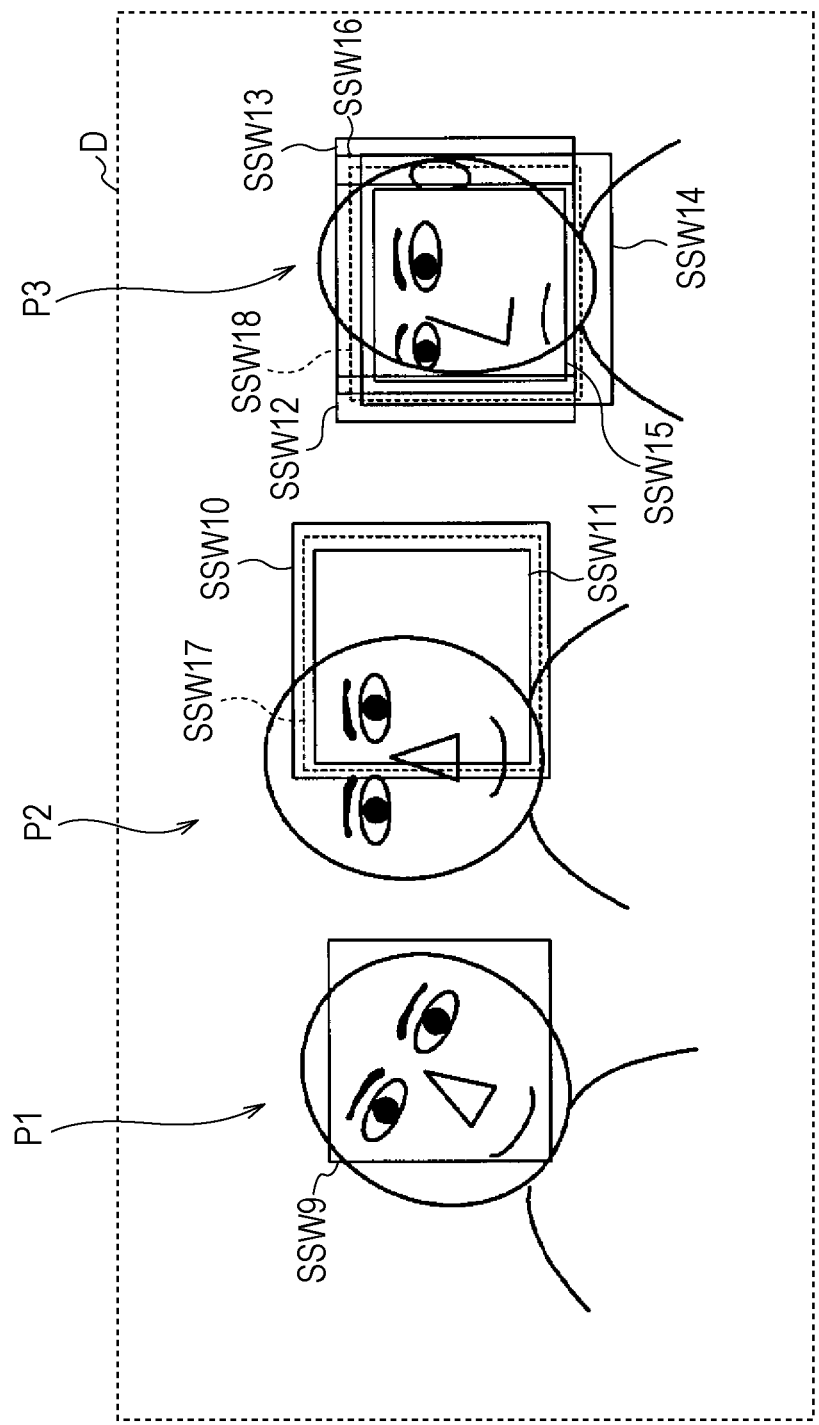
FIG. 10 is a diagram illustrating an example of a detection success window which is stored as a result of the profile face detection process.

FIG. 10 shows an example of a plurality of detection success windows SSW (the detection success windows SSW9 to SSW16) stored as windows that succeeded in detecting horizontal profile faces in S310 to S360 performed on the image data D. Here, FIG. 10 shows only a partial range of the image data D. In the example of FIG. 10, the detection success window SSW9 is located at a position of the face P1, the detection success windows SSW10 and SSW11 are overlapped at a position at which the windows encloses a half of the face P2, and the detection success windows SSW12 to SSW16 are overlapped at the position of the face P3. Accordingly, the overlapping window unification portion 25 unifies the detection success windows SSW10 and SSW11 into a new detection success window SSW17, and unifies the detection success windows SSW12 to SSW16 into a new detection success window SSW18. The detection success window SSW9 to SSW11 are stored as detection success windows SSW although there is no profile face detected, e.g., a tilted frontal face (the face P1) and a half of an upright frontal face (the face P2) are detected as the upright profile faces).

In S370, similarly to S270, the overlapping window unification portion 25 stores the respective information (the position, the size, the pose of the face image, and the rotation angle of the rectangular filter F), which relates to respective detection success windows SSW17 and SSW18 generated by the unification, in the internal memory 12. In addition, the overlapping window unification portion 25 removes information which relates to detection success windows SSW10 and SSW11, which were the unification sources of detection success window SSW17, and also the information which relates to detection success windows SSW12 to SSW16, which were the unification sources of detection success window SSW18, from the internal memory 12. The poses of the face images and the rotation angles of the rectangular filters F in the information of windows SSW17 and SSW18 are respectively the same as the poses of the face images (the horizontal profile of the face and uprightness of the face) and the rotation angles (0°) of the rectangular filters F of the detection success windows SSW10 and SSW11, and the detection success windows SSW12 to SSW16.

In S380, as a result of S310 to S370, and similarly to S280, the face image detection section 20 adds the number of detections (successes) Vpe to the information on the detection success window SSW stored in the internal memory 12. Here, the number of detections Vpe=1 is given to each detection success window SSW (in the example of FIG. 10, SSW9) which is not determined as the unification target in S370. In contrast, the number of detections Vpe=2 corresponding to unified detection success windows SSW10 and SSW11 is given to detection success window SSW17. Likewise, the number of detections Vpe=5 corresponding to unified detection success windows SSW12 to SSW16 is given to success window SSW18. Accordingly, the process of S300 (the profile face detection process) ends.

In S400 (FIG. 2), the image rotation portion 24 rotates all of the image data D by a predetermined angle.

Figure 11:
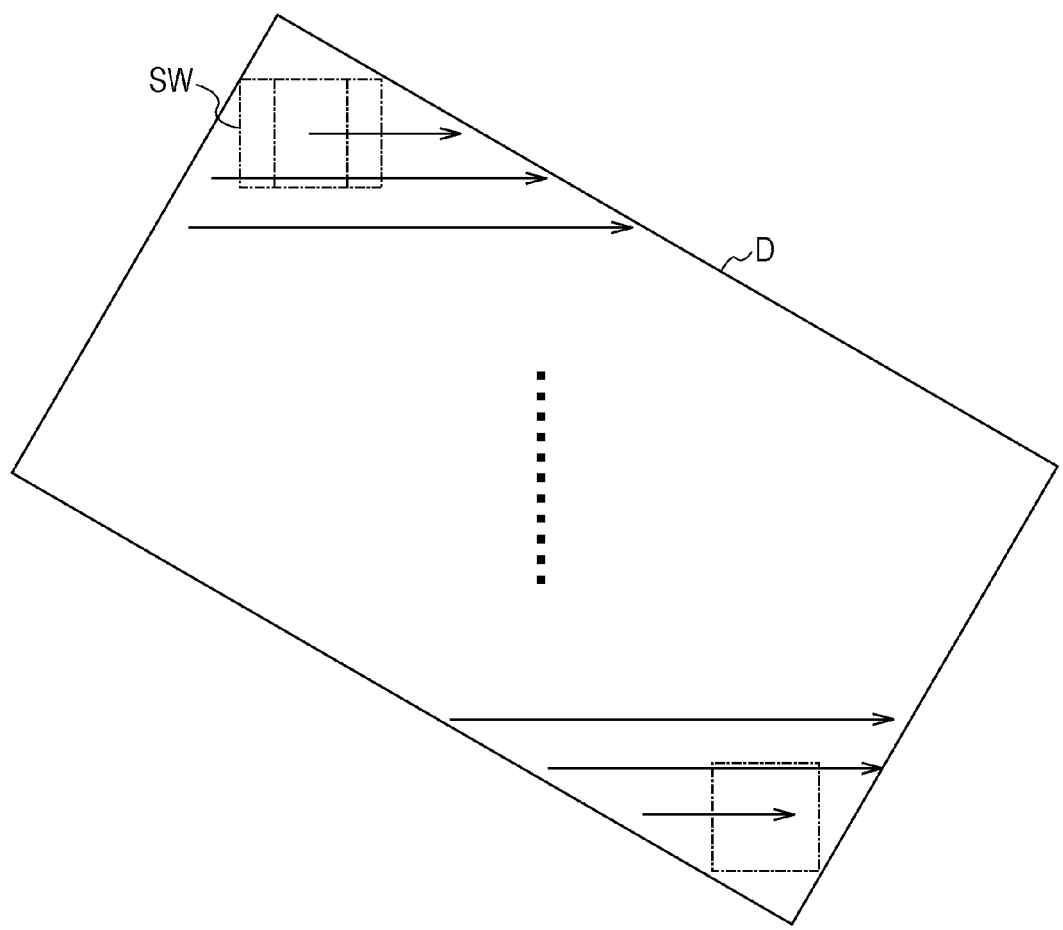
FIG. 11 is a diagram illustrating an example of a condition in which the detection window is set in the image data which is rotated in the clockwise rotation direction.

In S500, the face image detection section 20 performs the frontal face detection process on the image data D which was rotated in S400. The frontal face detection process performed in S500 is largely the same as the frontal face detection process of S200 (refer to FIG. 4). However, the rectangle of the detection window SW set in the image data D is not parallel to the vertical side and horizontal side of the image data D as shown in FIG. 11 since the image data D was tilted. FIG. 11 shows a condition in which the detection window SW is set in the image data D which was rotated by 30° in the clockwise rotation direction (+side) in S400.

In the frontal face detection process of S500, if the information on the detection success window SSW is stored in the internal memory 12 (the process corresponding to S240), and if the information on the detection success window SSW after the unification of the plurality of detection success windows SSW is stored in the internal memory 12 (the process corresponding to S270), then information that there is no profile to the face and that the face is tilted (tilt=−30°) is stored. That is, in S400, when the image data D is rotated by 30° in the clockwise rotation direction (+side) and then it is determined that a frontal face is present, this leads to the following determination. The corresponding face is tilted by about 30° in the counter-clockwise rotation direction (−side) with respect to the vertical direction or the horizontal direction of the image data D in the image data D. Hence, the information that the face is tilted (tilt=−30°) is stored. Further, in the frontal face detection process of S500, if the information of the detection success window SSW is stored in the internal memory 12 as a result of S210 to S270, the number of detections (successes) Vfg is added to the corresponding information (the process corresponding to S280). Also in this case, the number of detections Vfg=1 is given to each detection success window SSW which is not determined as the unification target. In addition, the number of detections Vfg corresponding to the number of the detection success windows SSW formed as the unification source is given to each detection success window SSW generated by the unification. If the image data D exemplified in FIG. 3 is the process target, there is no frontal face which is tilted by about 30° in the counter-clockwise rotation direction. Hence, there is a low possibility that a face image will be detected in the corresponding S500.

In S600, the face image detection section 20 performs the profile face detection process on the image data D which was rotated in S400. The profile face detection process performed in S600 is largely the same as the profile face detection process of S300 (refer to FIG. 9). In the profile face detection process of S600, if the information on the detection success window SSW, which is determined to have succeeded in detection of a profile face, is stored in the internal memory 12 (the process corresponding to S340), and if the information on the detection success window SSW after the unification of the plurality of detection success windows SSW is stored in the internal memory 12 (the process corresponding to S370), regarding the pose of the face image, then the information that the face is turned (horizontal profile) and the face is tilted (tilt=−30°) is stored. Further in S600, if the information about the detection success window SSW is stored in the internal memory 12 as a result S310 to S370, then the number of detections (successes) Vpg is added to the corresponding information (the process corresponding to S380). Also, the number of detections Vpg=1 is given to each detection success window SSW which is not determined as the unification target. In addition, the number of detections Vpg corresponding to the number of the detection success windows SSW formed as the unification source is given to each detection success window SSW generated by the unification. If the image data D exemplified in FIG. 3 is the process target, there is no profile face which is tilted by about 30° in the counter-clockwise rotation direction. Hence, there is a low possibility that a face image will be detected in the corresponding S600.

Figure 12:
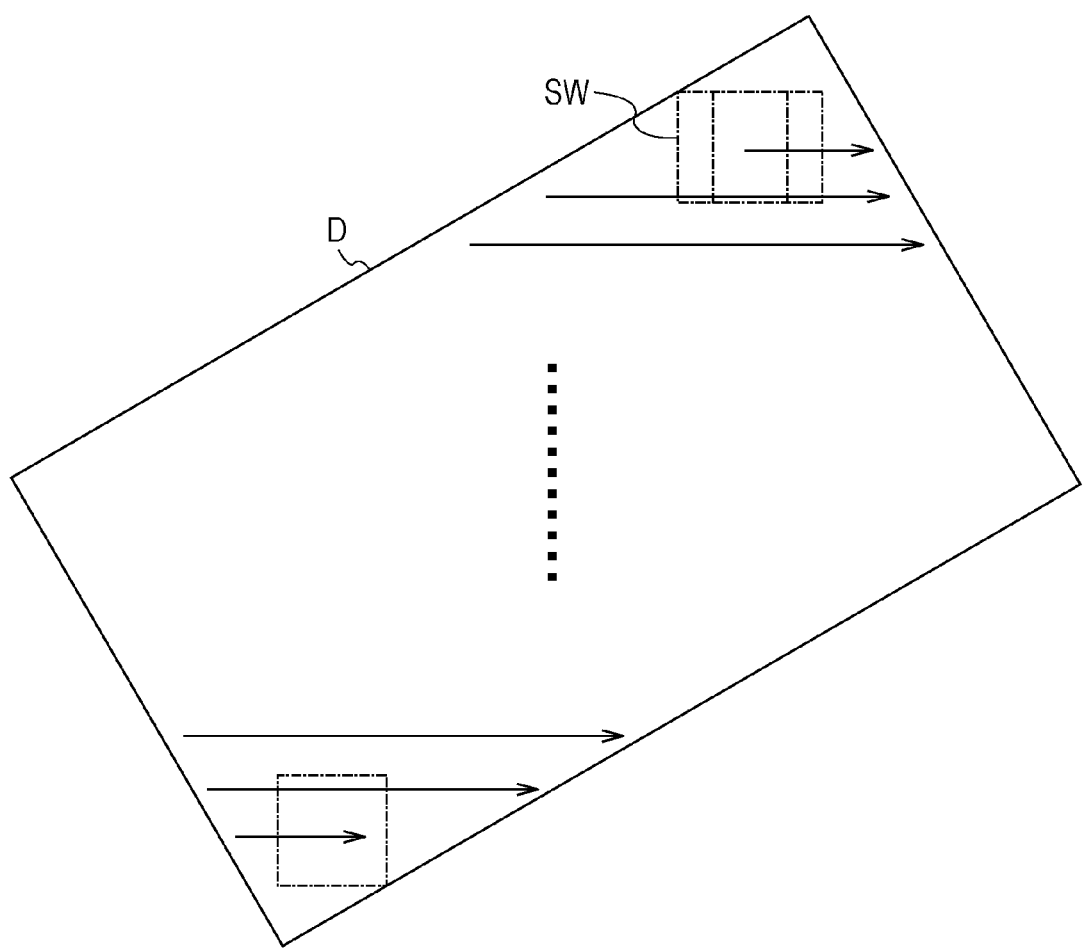
FIG. 12 is a diagram illustrating an example of a condition in which the detection window is set in the image data which is rotated in the counter-clockwise rotation direction.

In S700, the image rotation portion 24 rotates the entire image data D by a predetermined angle in the direction opposite to the rotation direction of S400. In S800, the face image detection section 20 performs the frontal face detection process on the image data D which was rotated in S700. The frontal face detection process performed in S800 is largely the same as the frontal face detection process of S500. The rectangle of the detection window SW set in the image data D is not parallel to the vertical side and horizontal side of the image data D as shown in FIG. 12 since the image data D itself is tilted. FIG. 12 shows a condition in which the image data D rotated in S400 is rotated by 60° in the counter-clockwise rotation direction (−side) in S700 and then the detection window SW is set in the image data D in S800.

In the frontal face detection process of S800, if the information on the detection success window SSW, which is determined to have succeeded in detection of a frontal face, is stored in the internal memory 12 (the process corresponding to S240), and if the information on the detection success window SSW after the unification of the plurality of detection success windows SSW is stored in the internal memory 12 (the process corresponding to S270), regarding the pose of the face image, then the information that there is no profile to the face and the face is tilted (tilt=+30°) is stored. That is, in S700, when the image data D is rotated by 60° in the counter-clockwise rotation direction (−side) and then it is determined that the frontal face is present, this leads to the following determination. The corresponding face is tilted by about 30° in the clockwise rotation direction (+side) with respect to the vertical direction or the horizontal direction of the image data D in the image data D. Hence, the information that the face is tilted (tilt=+30°) is stored. Also in S800, similarly to S500, the number of detections (successes) Vfg can be added as the information on the detection success window SSW (the process corresponding to S280). If the image data D exemplified in FIG. 3 is the process target, then there is a frontal face which is tilted by about 30° in the clockwise rotation direction. Hence, in the corresponding S800, there is a high possibility that the detection success window SSW (the detection success window SSW into which the plurality of detection success windows SSW is unified) will be generated and positioned to include the face P1.

In S900, the face image detection section 20 performs the profile face detection process on the image data D which was rotated in S700. The profile face detection process performed in S900 is largely the same as the profile face detection process of S600. In the profile face detection process of S900. If the information on the detection success window SSW, which is determined to have succeeded in detection of the profile face, is stored in the internal memory 12 (the process corresponding to S340), and if the information on the detection success window SSW after the unification of the plurality of detection success windows SSW is stored in the internal memory 12 (the process corresponding to S370), regarding the pose of the face image, then the information that the face is turned (horizontal profile) and that the face is tilted (tilt=+ 30°) is stored. Also in S900, similarly to S600, the number of detections (successes) Vpg can be added as the information on the detection success window SSW (the process corresponding to S380). If the image data D exemplified in FIG. 3 is the process target, there is no profile face which is tilted by about 30° in the clockwise rotation direction. Hence, there is a low possibility that the face image will be detected in the corresponding S900.

Figure 13:
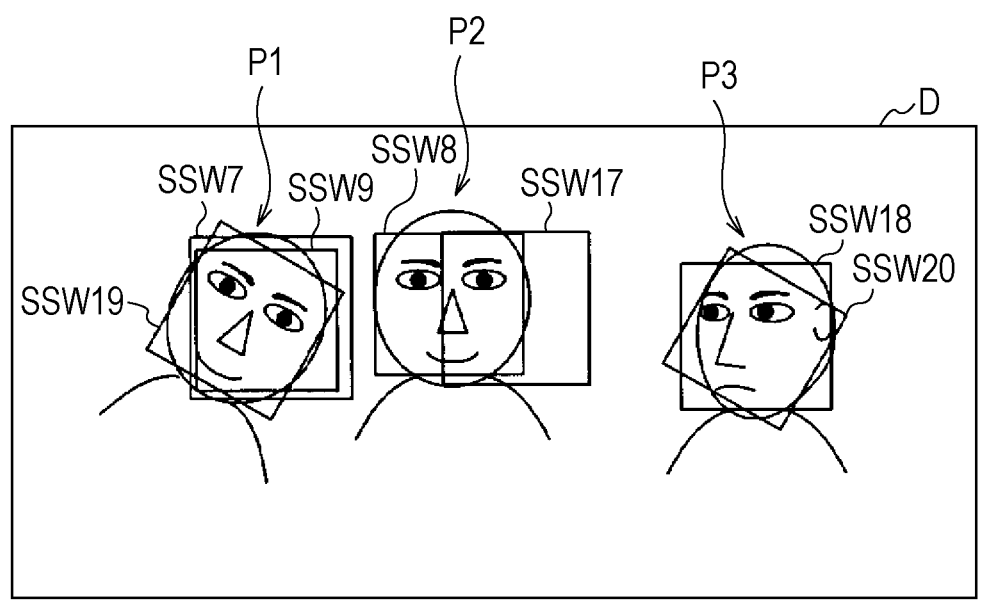
FIG. 13 is a diagram illustrating an example of the detection success windows which is stored through the face detection process performed on each pose.

FIG. 13 shows detection success windows SSW (including the ununified detection success windows and the detection success windows which are generated by unifying the plurality of detection success windows), which are stored in the internal memory 12 via S100 to S900, in the image data D. FIG. 13 exemplifies the detection success windows SSW7, SSW8, SSW9, SSW17, SSW18, SSW19, and SSW20. The detection success windows SSW7 and SSW8 are stored in S200 as described above (refer to FIG. 8), and the detection success windows SSW9, SSW17, and SSW18 are stored in S300 as described above (refer to FIG. 10). Further, the detection success window SSW19 is stored in S800 (the detection of the tilted frontal face), and for example, the number of detections Vfg is equal to 6. Further, the detection success window SSW20 is stored in S900 (the detection of the tilted profile face), and for example, the number of detections Vpg is equal to 1. As shown in FIG. 13, the detection success windows SSW7, SSW9, and SSW19 overlap with each other on the face P1, the detection success windows SSW8, SSW17 overlap with each other on the face P2, and the detection success windows SSW18 and SSW20 overlap with each other on the face P3. Consequently, in image data D, as a result of the process of S100 to S900, the plurality of face poses are detected from all of the faces P1 to P3.

In S1000, the face image determination section 30 selects two detection success windows SSW, for use as comparison targets from the information of the detection success windows SSW which are stored in the internal memory 12 from S100 to S900.

In S1100, the face image determination section 30 determines whether or not the comparison targets, i.e., the two selected detection success windows SSW from S100, overlap with each other. For example, one of the two detection success windows SSW is set as the attention window. If the attention window overlaps with the other detection success window SSW in an area of a predetermined percent or more, it is determined that the corresponding two detection success windows SSW overlap with each other. When it is determined that the two detection success windows SSW overlap with each other, the region formed by the two detection success windows SSW corresponds to a pose overlap region.

If the face image determination section 30 determines that the two detection success windows SSW overlap with each other in S1100, the process advances to S1200. In contrast, if it is determined that the two detection success windows SSW do not overlap with each other, the process advances to S1400. S1000 and S1100 are performed on all possible combinations of the detection success windows SSW from S100-S900.

Figure 14:
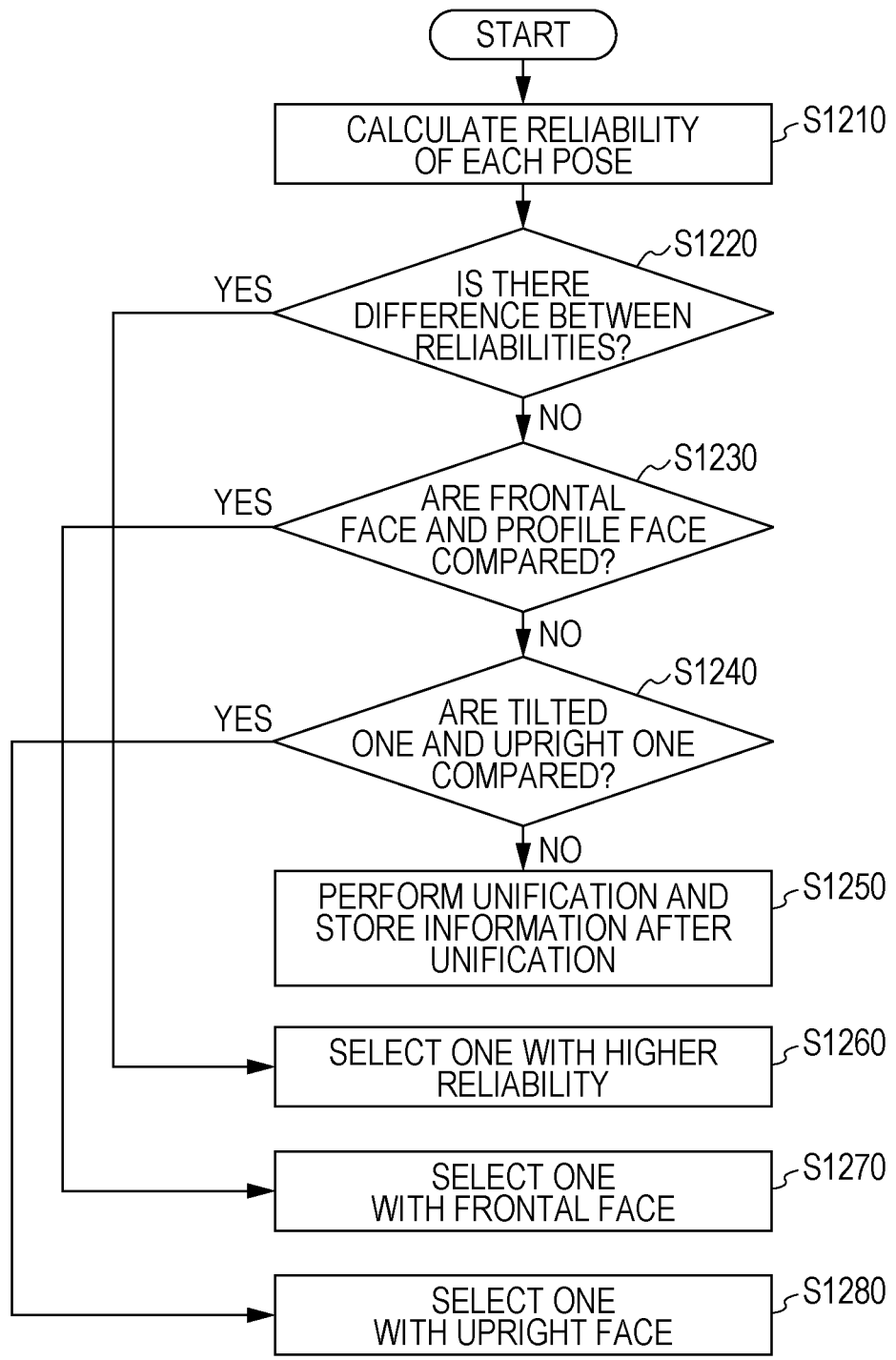
FIG. 14 is a flowchart illustrating a process of selecting any of the two detection success windows.

FIG. 14 details S1200 in a flowchart. In S1210, the face image determination section 30 calculates respective reliabilities of the detection results from S1100, i.e., two detection success windows overlapping to a predetermined extent. In the face image determination section 30, the number of detections may be defined to be equal to the reliability. For example, overlapping detection success windows SSW8 and SSW17 (refer to FIG. 13) may be set as comparison targets. In this case, the reliability of the pose (no profile to the face and uprightness of the face) of the face corresponding to the detection success window SSW8 is equal to the number of detections Vfe (=6) for the detection success window SSW8. In addition, the reliability of the pose (the profile of the face and uprightness of the face) of the face corresponding to the detection success window SSW17 is equal to the number of detections Vpe (=2) for the detection success window SSW17.

The face image determination section 30 calculates the reliabilities of the detection results for each pose of the face images detected in the pose overlap region by respectively correcting the number of detections of the detection success window SSW with a predetermined correction coefficient corresponding to each pose of the face images. In the embodiment, the correction coefficient corresponding to a frontal face (no profile) is set as (a) the correction coefficient corresponding to a profile face is set as (b), (a) and (b) being predetermined values. Accordingly, the face image determination section 30 calculates the reliability of the pose (no profile to the face and uprightness of the face) of the face of the detection success window SSW8 as the number of detections (a) Vfe for the detection success window SSW8, and calculates the reliability of the pose (the profile of the face and uprightness of the face) of the face of the detection success window SSW17 as the number of detections (b) Vpe for the detection success window SSW17.

As described above, the correction coefficients a and b are provided because the respective accuracies of singular detections corresponding to different pose faces may not be the same. That is, the accuracy of the frontal face detection performed by the frontal face detection portion (the frontal face detector) 22 may not coincide with the accuracy of the profile face detection performed by the profile face detection portion (the profile face detector) 23. In particular, in the profile face detection portion 23, the variety of the profile face as a detection target is large, and thus it is more difficult to increase the detection accuracy as compared with the frontal face detection portion 22. Thus, the number of detections of the detection success window SSW corresponding to the frontal face and the number of detections of the detection success window SSW corresponding to the profile face are respectively corrected by the correction coefficients (a) and (b) corresponding to the poses of the faces. In such a manner, the difference between the detection accuracies is compensated, thereby enabling comparison between the corrected both values. Here, basically, (a)>(b).

In S1220, the face image determination section 30 determines whether or not there is a difference between the two reliabilities, by comparing the reliabilities of the two detection success windows SSW as the comparison targets. If there is a difference between the reliabilities, the process advances to S1260, the detection success window SSW corresponding to a higher reliability is selected. From the example above, when the reliability corresponding to the detection success window SSW8 and the reliability corresponding to the detection success window SSW17 are compared, the reliability corresponding to the detection success window SSW8 of the frontal face with a larger number of detections is greater, and thus the detection success window SSW8 is selected in S1260. In contrast, if it is determined that there is no difference between the two reliabilities in S1220, the face image determination section 30 selects, on the basis of the predetermined priority order of the face poses, one of the two detection success windows SSW set as the comparison targets.

If there is no determined difference in reliabilities, then the face image determination section 30 determines whether or not there is the comparison between the frontal face and the profile face in S1230. Continuing the example from above, the detection success window SSW8 and the detection success window SSW17 are set as the comparison targets, with success window SSW8 corresponding to a frontal face and detection success window SSW17 corresponding to a profile face, and thus "Yes" is determined in the corresponding S1230. In this case, the face image determination section 30 advances the process to S1270, and selects the detection success window SSW corresponding to the frontal face. That is, in the case where the reliabilities are the same, if there is the comparison between the frontal face and the profile face, the frontal face is prioritized (the determination that the frontal face is present in the pose overlap region is prioritized). In contrast, if it is determined that a frontal face and a profile face are not being compared in S1230, then the face image determination section 30 advances the process to S1240. For example, (this would be true for) a comparison between the detection success windows SSW7 and SSW19, respectively corresponding to a upright frontal face and a tilted frontal face (refer to FIG. 13).

In S1240, the face image determination section 30 determines whether or not there is a comparison between an upright face image and a titled face image. For example, if the detection success window SSW7 and the detection success window SSW19 are used, this is the respective comparison between an upright face image and a titled face image, and thus "Yes" is determined in the corresponding S1240. In this case, the face image determination section 30 advances the process to S1280, and selects the detection success window SSW corresponding to the upright face image. Accordingly, if the reliabilities are the same and there is no comparison between the frontal face and the profile face, the upright face image is prioritized (the determination that the upright face image is present in the pose overlap region is prioritized).

However, if it is determined that there is no comparison between the upright face image and the titled face image in S1240, the face image determination section 30 advances the process to S1250. The process advances to S1250, which is a result the two detection success windows SSW have the same reliabilities and have the same poses of the face images. From this it is inferred that originally one unified detection success window SSW was divided into two. Accordingly, the face image determination section 30 unifies the two detection success windows SSW set as the comparison targets. The unification method is as described above. Then, the information corresponding to the unified detection success window SSW is stored in the internal memory 12. A case advancing the process to S1250 may be very rare.

In S1300 (FIG. 2), the face image determination section 30 removes the information corresponding to the detection success window SSW which was not selected in S1200. In addition, if the above-mentioned process of S1250 is performed in S1200, the information, which corresponds to the two detection success windows SSW as the unification source of the detection success windows SSW unified in S1250, is removed. As a result, the overlap state between the detection success windows SSW, which are determined to overlap with each other in the previous S1100, is released. That is, the pose of the face image which is selected in S1200, between the two detection success windows SSW determined to overlap with each other in S1100, is determined as the pose of a face image which is present in the shared region, unless there are further detection success windows SSW in the shared region).

In S1400, if combination of the detection success windows SSW which are not yet used as comparison targets in S1000 still exists among the detection success windows SSW of which the information are stored in the internal memory 12, the face image determination section 30 returns the process to S1000. Then, the face image determination section 30 processes the information of two detection success windows SSW, which are a combination of not yet compared windows, as new comparison targets. In contrast, in S1400, if the face image determination section 30 determines that all combinations of the applicable detection success windows SSW were used as comparison targets in S1000, then the face image determination process is terminated.

Figure 15:
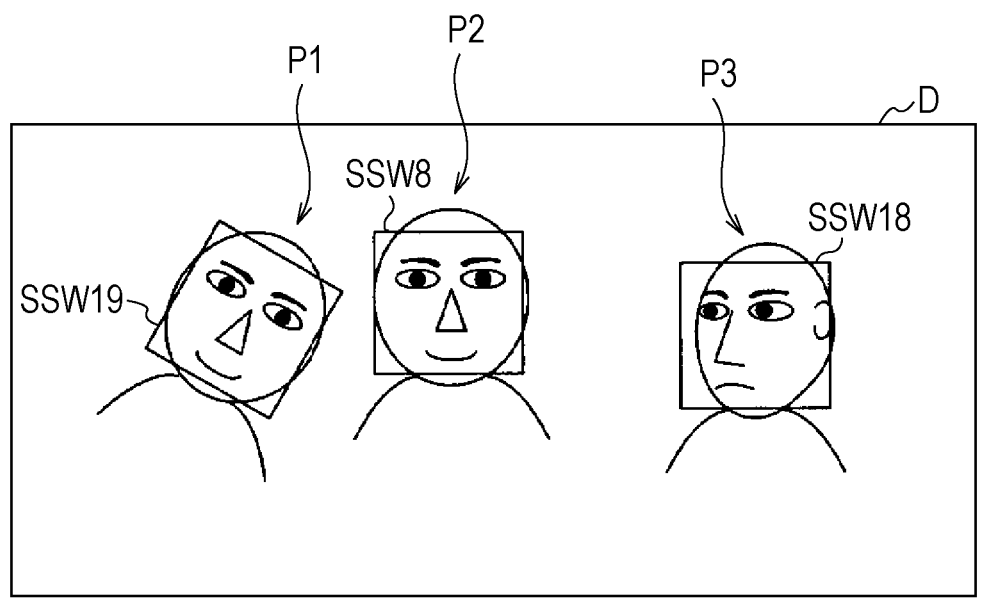
FIG. 15 is a diagram illustrating an example of the detection success window which is stored as a result of the face image detection/determination process.

FIG. 15 shows an example of the detection success windows SSW in the image data D in S1400 when it is determined that all the combinations of the detection success windows SSW were used as comparison targets in S1000. By comparing FIG. 15 (at the time of the end of S1400) with FIG. 13 (at the time of the end of S900), it is noted that: the detection success windows SSW7 and SSW9 are removed from the detection success windows SSW7, SSW9, and SSW19 which overlap with each other on the face P1; the detection success window SSW17 is removed from the detection success windows SSW8 and SSW17 which overlap with each other on the face P2; and the detection success window SSW20 is removed from the detection success windows SSW18 and SSW20 which overlap with each other on the face P3. In other words, the face image determination section 30 determines that the face image of the face pose (no profile and a tilt=+30°) relating to the detection success window SSW19 is present in the region in which the detection success windows SSW7, SSW9, and SSW19 overlap with each other. The face image determination section 30 also determines that the face image of the face pose (no profile and upright) relating to the detection success window SSW8 is present in the region in which the detection success windows SSW8 and SSW17 overlap with each other. In addition, the face image determination section 30 also determines that the face image of the face pose (the profile (the horizontal profile) and upright) relating to the detection success window SSW18 is present in the region in which the detection success windows SSW18 and SSW20 overlap with each other.

As described above, the printer 10 repeatedly sets the detection window SW while changing the position and the size of the detection window SW in the image data D, and attempts to detect a face image having a certain pose on the basis of the image information within the detection window SW when setting the detection widow SW. In addition, when the detection of the face image of the corresponding pose is repeated, a plurality of the detection success windows SSW which succeed in detection may overlap with each other. In this case, the plurality of the corresponding detection success windows SSW overlapping with each other is unified into one, and the number of detections in the corresponding overlap region is stored (the number of the detection success windows SSW of the unification source). Further, by changing the face pose as the detection target, the process is performed on the plurality of face poses. As a result, when the detection success windows SSW corresponding to the poses of the different faces overlaps with each other, that is, when a plurality of poses is detected from the same face, the reliabilities of the poses of the faces for each overlapped detection success window SSW are calculated on the basis of the numbers of detections for each overlapped detection success window SSW. In addition, the face pose corresponding to the detection success window SSW having a higher reliability is determined as the pose of a face image which is present in the corresponding overlap region. Hence, when the plurality of poses is detected from the same face in the image data, the pose (profile of the face and tilt of the face) of the corresponding face is determined faster and with a higher accuracy as compared with the prior art. In addition, by accurately determining the face pose from which a plurality of poses are detected in the image data, it is possible to accurately perform various processes, which require the face pose as information, such as a modification process for a face and a process of monitoring a person.

ALTERNATIVE EMBODIMENTS

The invention is not limited to the above-mentioned embodiments, and may be modified into various forms without departing from the technical scope of the invention. Additionally, the following modified examples fall under this scope. It is apparent that the technical scope of the invention also involves configurations obtained by combinations of the embodiments and the modified examples. The above description may be also applied to items which are not described in the following section.

Example 1

The face image detection section 20 performs the process, which determines the presence/absence of the face image for one face pose of a plurality of face poses as detection targets, multiple times in the image data D by changing the detection window SW. In the course of this process, the region, in which the number of times that the face image can be detected exceeds the predetermined threshold, may be thereafter excluded from the targets for setting detection windows SW in order to detect the face image corresponding to the one face pose and the other face pose. That is, the face image detection section 20 detects a face image (for example, the upright frontal face) of a certain pose by repeatedly setting the detection window SW. In the course of the detection, if the detection success windows SSW overlap with each other, at each time of occurrence of the overlap, the face image detection section 20 counts the number of overlaps (that is, the number of detections) of the detection success windows SSW within the region in which the corresponding overlap occurs. By using the count, if the upright frontal face is detected (S200), the process advances to the above-mentioned S240.

In addition, at a time when the count value for a group including the detection success windows SSW (a group of the detection success windows SSW overlapping with each other) exceeds a predetermined threshold, the face image detection section 20 unifies the group of the detection success windows SSW as described above, and stores information (including the number of detections) on the unified detection success windows SSW in the internal memory 12. Then, the region within the image data D corresponding to the unified detection success windows SSW is excluded from the face image detection targets, and thereafter the setting of the detection window SW is also not performed thereon. That is, on the basis of the corresponding count value being larger than the threshold, it is determined that the face of the pose set as a detection target at the time is reliably present in the corresponding region, and thus the face image detection process is performed no more on the corresponding region. As a result, for example, in the course of the upright profile face detection (S300), if there is a region in which the detection success windows SSW, of which the number exceeds the corresponding threshold, for the upright profile face overlaps with each other, the region corresponding to the detection success window SSW, which is obtained after the overlapped detection success windows SSW are unified, may not be subjected to the following face image detection including the face image detection for different poses. Hence, it is possible to greatly reduce the processing load of the printer 10.

Example 2

In the above-mentioned example, the image processing apparatus is embodied as the printer 10. However, the image processing apparatus may be embodied as various image processing devices such as a PC, a server, a digital camera, and a scanner. That is, the various image processing devices functionally have at least the face image detection section 20 and the face image determination section 30, and perform the face image detection/determination process on the input image.

Example 3

Figure 16:
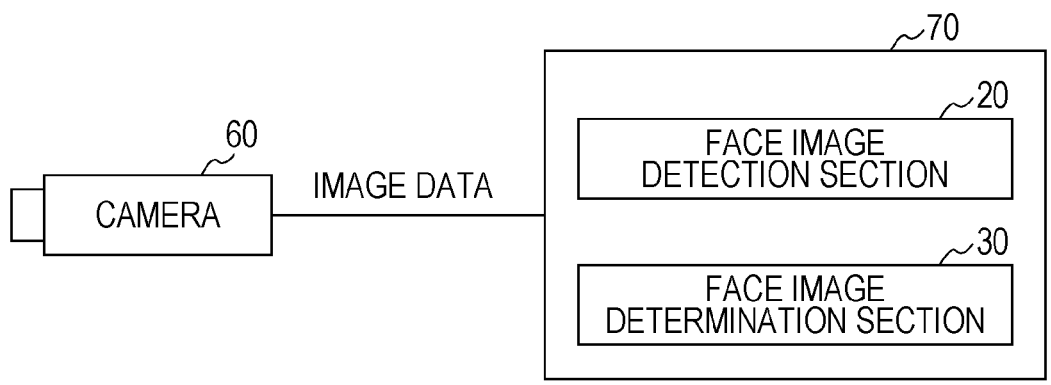
FIG. 16 is a block diagram schematically illustrating a system according to a modified example.

The image processing apparatus may change the correspondence relationship between the pose of a face image and the correction coefficients (a) and (b) depending on whether the input image is a still image or a moving image. FIG. 16 schematically shows the system according to the modified example. In the modified example, the image data generated through photographing by a camera 60 is output to a PC 70 capable of communicating with the camera 60 through a wired or wireless connection. The PC 70 corresponds to an example of the image processing apparatus according to the embodiment. The PC 70 implements the functions of the face image detection section 20 and the face image determination section 30 by executing related programs. The camera 60 is able to photograph both still images and moving images. In the corresponding configuration, the PC 70 determines whether the image data which is input from the camera 60 corresponds to a still image or a moving image. It is determined whether the image data corresponds to a still image or a moving image, with reference to, for example, information in the header attached to the image data, the file format of the image, and the like. If the PC 70 determines that the image data corresponds to a still image, correction coefficients (a) and (b), which are set for the still image in advance, are used. If the PC 70 determines that the image data corresponds to a moving image, correction coefficients (a') and (b'), which are set for the moving image in advance, are used. The correction coefficients (a) and (b) for the still image satisfies the relationship of (a)>(b), and the correction coefficients (a') and (b') for the moving image satisfies the relationship of (a)<(b).

Specifically, when the face image detection determination process is intended to be performed on the image data as a still image as described above, the reliability of the number of detections of the detection success window SSW corresponding to the frontal face (no profile) is calculated through correction using the correction coefficient (a) which is set for the still image. In addition, the reliability of the number of detections of the detection success window SSW corresponding to the profile face is calculated through correction using the correction coefficient (b) which is set for the still image. On the other hand, when the face image detection determination process is intended to be performed on the respective stills of the image data taken from a moving image, the reliability of the number of detections of the detection success window SSW corresponding to the frontal face is calculated through correction using the correction coefficient (a') which is set for a moving image. In addition, the reliability of the number of detections of the detection success window SSW corresponding to the profile face is calculated through correction using the correction coefficient (b') which is set for the moving image.

According to the corresponding configuration, in the case where the input image is a still image, it becomes comparatively simpler to determine the pose of the face image, which is detected from the inside of the image, from a non-profile pose (frontal pose). In addition, when the input image is a moving image, it becomes easy to determine the pose of the face image, which is detected from the inside of the image, as a profile pose. That is, since the still image is mostly photographed in front of a person, by setting (a)>(b) as described above, it becomes simpler to determine the pose of the face image which matches with its actual pose (it is possible to prevent the frontal face from being determined as a profile face). On the other hand, in the case of video cameras, such as a surveillance camera, for taking moving images, a walking person is usually photographed from the side. Hence, by setting (b')>(a') as described above, it becomes easy to determine the pose of the face image which matches with the actual pose of the moving image taken by a video camera (it is possible to prevent a profile face from being determined as a frontal face). Further, in the case where the input image is a moving image, if it is determined that there is a comparison between the frontal face and the profile face in S1230 (FIG. 14), the detection success window SSW corresponding to the profile face may be selected in S1270.

Example 4

In the above description, the profile face detection portion (the profile face detector) 23 sets a horizontal profile face as the detection target. However, an upward/downward profile face may be detected in addition thereto. The upward/downward profile face means that an upwardly-turned face (an upward face) or a downwardly-turned face (a downward face). That is, in the image processing apparatus of the modified example, just as the frontal face detector 22a and the profile face detector (for detecting the horizontal profile face) are provided, a profile face detector for detecting the upward/downward profile face is provided in advance. The profile face detector is formed of respective determination stages of performing learning on the basis of a plurality of sample image data generated from the image of upward/downward profile faces and other face images so as to thereby optimize the rectangular filters F, the thresholds, the filter determination values, and the like. In addition, by using the profile face detector for detecting upward/downward profile faces, the profile face detection portion 23 performs the following S350, S650, and S950, and determines the presence/absence (success/failure of detection of a profile face) of the upward/downward profile face for the image in the detection window SW.

Figure 17:
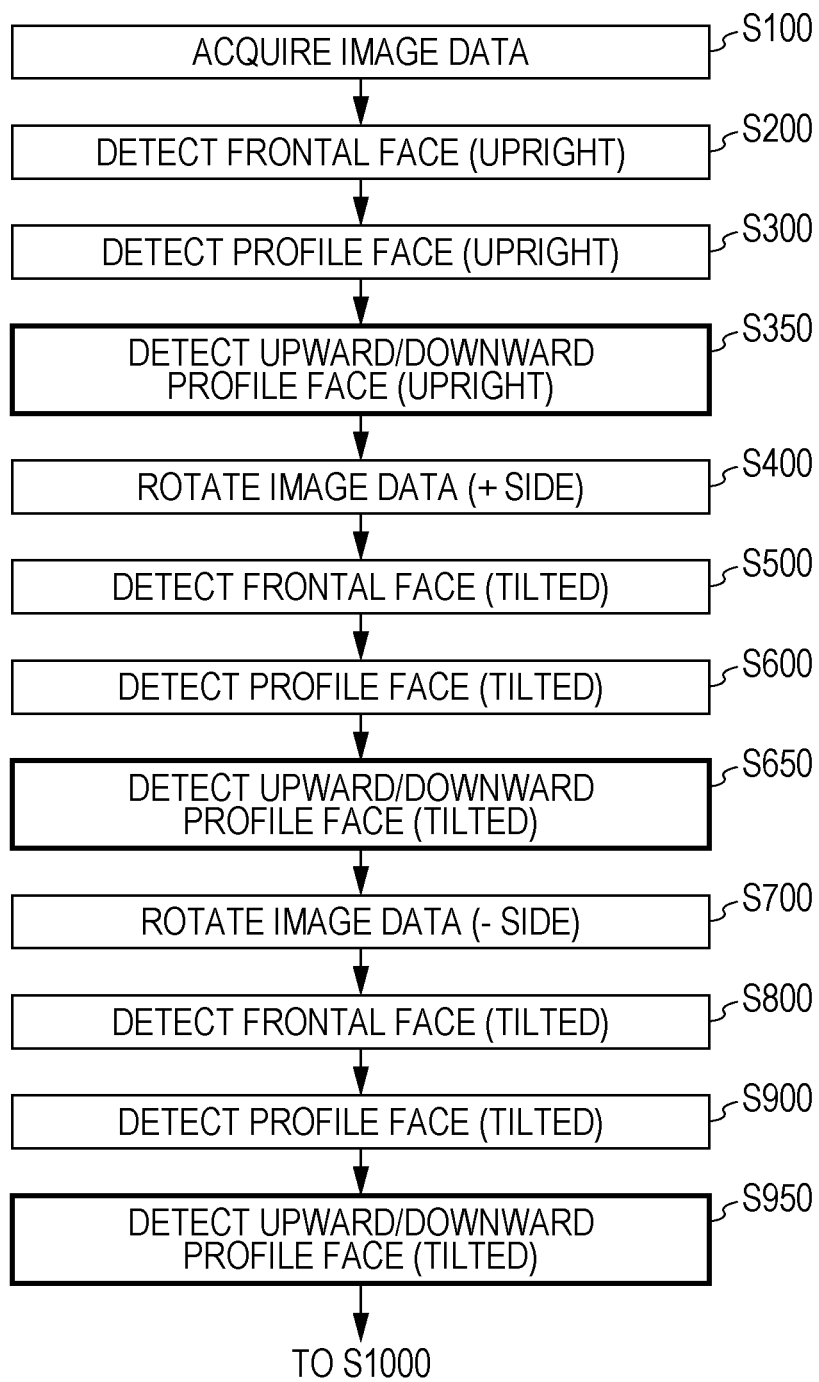
FIG. 17 is a flowchart illustrating a part of the face image detection/determination process according to the modified example.

S350, S650, and S950 are incorporated in the range of S100 to S1000 of FIG. 2 mentioned above at predetermined timings, for example, as shown in FIG. 17. In S350, the face image detection section 20 performs an upward/downward profile face detection process on the image data D. The profile face detection process performed in S350 is largely the same as the process of S300 (refer to FIG. 9) except that the profile face detector for detecting an upward/downward profile face is used. In the profile face detection process of S350, if the information on the detection success window SSW, which is determined to have succeeded in detection of the profile face, is stored in the internal memory 12 (the process corresponding to S340), and if the information on the detection success window SSW after the unification of the plurality of detection success windows SSW is stored in the internal memory 12 (the process corresponding to S370), regarding the pose of the face image, the information that the face is turned (upward/downward profile) and the face is upright is stored.

In S650, the face image detection section 20 performs the upward/downward profile face detection process on the image data D which was rotated in S400. The profile face detection process performed in S650 is largely the same as the profile face detection process of S350. However, in the profile face detection process of S650, if the information on the detection success window SSW, which is determined to have succeeded in detection of the profile face, is stored in the internal memory 12 (the process corresponding to S340), and if the information on the detection success window SSW after the unification of the plurality of detection success windows SSW is stored in the internal memory 12 (the process corresponding to S370), regarding the pose of the face image, then information that the face is turned (upward/downward profile) and the face is tilted (tilt=−30°) is stored. In S950, the face image detection section 20 performs the upward/downward profile face detection process on the image data D which was rotated in S700. The profile face detection process performed in S950 is the same as the profile face detection process of S650. However, in the profile face detection process of S950, if the information on the detection success window SSW, which is determined to have succeeded in detection of the profile face, is stored in the internal memory 12 (the process corresponding to S340), and if the information on the detection success window SSW after the unification of the plurality of detection success windows SSW is stored in the internal memory 12 (the process corresponding to S370), regarding the pose of the face image, then information that the face is turned (upward/downward profile) and the face is tilted (tilt=+30°) is stored.

As described above, the face image detection section 20 is able to respectively detect, regarding the profile of the face, the non-profile face (the frontal face), the horizontally turned profile face, and the upwardly-or-downwardly turned profile face, through the detection window SW. In this case, the face image determination section 30 uses correction coefficients (a), (b), and (c) when calculating the reliabilities in S1210 (FIG. 14). Coefficient (b) is a correction coefficient for calculating a reliability by correcting the number of detections of the detection success window SSW corresponding to a horizontal profile face. Coefficient (c) is a correction coefficient for calculating a reliability by correcting the number of detections of the detection success window SSW corresponding to an upward/downward profile face. Basically, in the relationship of (b)=(c), for example, if the input image is a still image, (a)>(b) or (c), and if the input image is a moving image, (a)<(b) or (c). As described above, the face image detection section 20 is able to respectively detect, regarding the profile of the face, the non-profile face (the frontal face), the horizontally turned profile face, and the upward/downward profile face, through the detection window SW. In this case, the face image determination section 30 performs the following S1245 and S1290.

Figure 18:
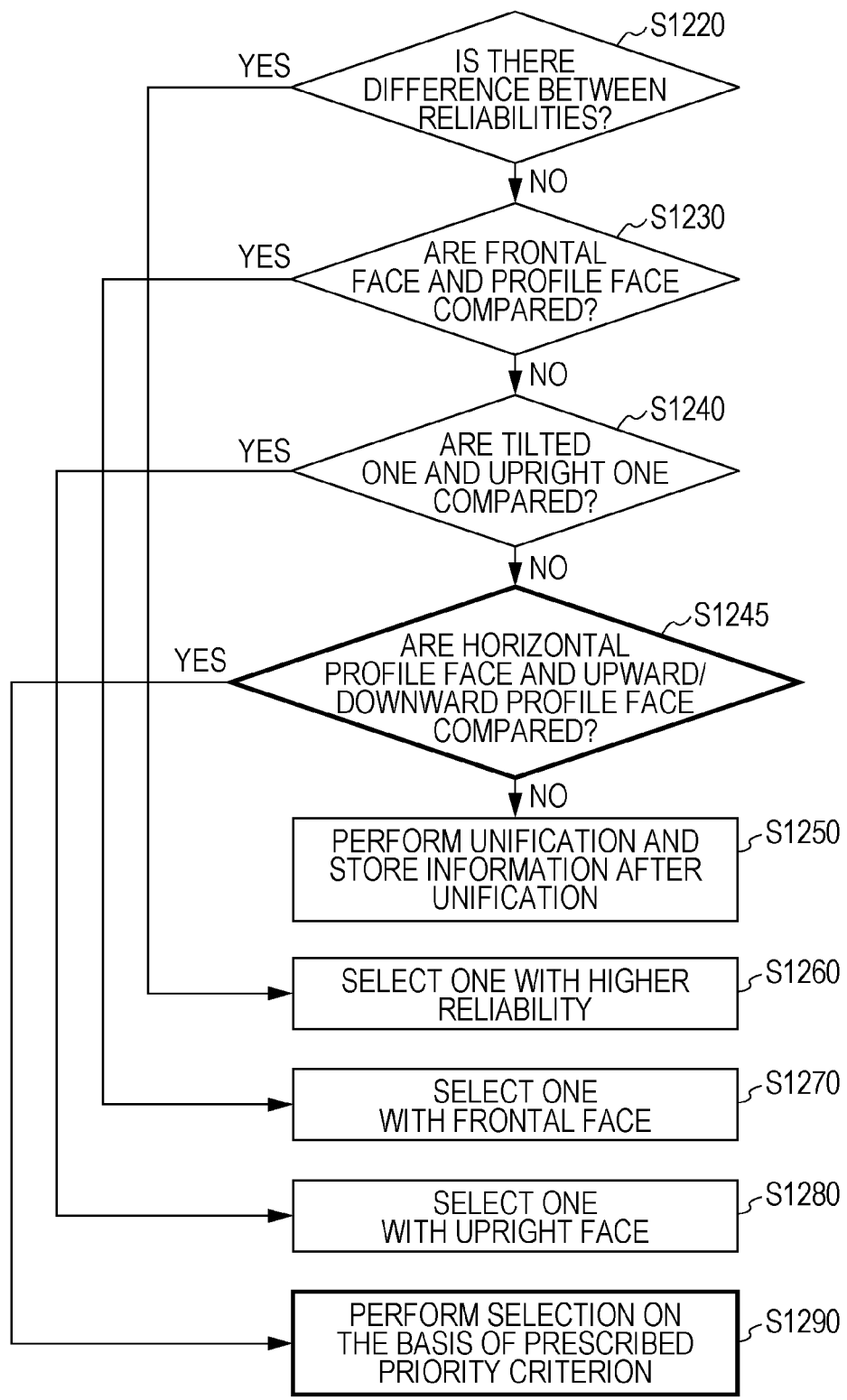
FIG. 18 is a flowchart illustrating a part of a process of selecting any of the two detection success windows according to the modified example.

S1245 is incorporated, for example, as shown in FIG. 18, at a predetermined timing after the determination if there is no difference between the reliabilities of the two detection success windows SSW which are set as the comparison targets in S1220 of FIG. 14. In this example, after "No" is determined in S1240, the face image determination section 30 determines whether or not there is a comparison between a horizontal profile face and a upward/downward profile face in S1245. If "Yes," the process advances to S1290, and if "No," the process advances to S1250. In S1290, on the basis of the prescribed priority criterion (here, it is assumed that the horizontal profile face is prioritized), any one of the detection success window SSW corresponding to the horizontal profile face and the detection success window SSW corresponding to the upward/downward profile face is selected. However, it is inferred that the detection success window SSW corresponding to the horizontal profile face is less likely to overlap with the detection success window SSW corresponding to an upward/downward profile face in the image data in practice.

The magnitude relation of the correction coefficients (a), (b), and (c) are not limited to the above description. For example, the input image may be photographed by the camera 60 (for example, a security camera of ATM) installed at a position at which the supposed subject is photographed from the upper side or the lower side of the subject. In this case, by setting the correction coefficient (c) of the correction coefficients (a), (b), and (c) to a larger value, the face pose detected from the input image may be easily determined as the upward/downward profile. Further, the input image may be photographed by the camera 60 (for example, a camera that photographs a walking person) installed at a position at which the supposed subject is photographed from the side of the subject. In this case, by setting the correction coefficient b of the correction coefficients (a), (b), and (c) to a larger value, the face pose detected from the input image may be easily determined as the horizontal profile. That is, in accordance with the photographing position and angle of the camera 60, the setting of the correction coefficients (a), (b), and (c) may be changed.

What is claimed is:

1. A method of using an image processing apparatus, the method comprising: receiving an image at the image processing apparatus; repeatedly scanning the image for a face, the face being in a directional pose; detecting a first pose and a second pose of the face; and determining reliabilities of the first and second pose being the directional pose based on a number of times each pose is detected during repeatedly electronically scanning the electronic image.

2. The method of claim 1, wherein repeatedly scanning comprises, sequentially setting and moving a detection window over a plurality of positions on the image, and processing the image within the set detection window at each respective position.

3. The method of claim 2, wherein sequentially setting and moving the detection window is performed over the entirety of the image for a predetermined number of cycles with the detection window reducing in size at the beginning of each cycle.

4. The method of claim 3, wherein processing a set portion of the image within the set detection window comprises extracting the presence of facial characteristics of the first or second pose using at least one filter.

5. The method of claim 4, wherein the first pose comprises a first face direction and a tilted first face direction, and wherein the second pose comprises a second face direction and a tilted second face direction.

6. The method of claim 5, wherein the image is repeatedly scanned in its entirety for the first face direction before the second face direction second, with the tilted face directions following the second face direction.

7. The method of claim 6, wherein after the image is repeatedly scanned for the second face direction, the image is rotated in a first direction relative to a position of the image when scanned for the first and second face directions and electronically scanned for the tilted first face direction and tilted face profile direction.

8. The method of claim 5, wherein the image is rotated in a second direction relative to the position of the image when scanned for the first and second face directions and electronically scanned for the tilted first face direction and tilted second face direction.

9. The method of claim 4, wherein each the first and second face directions are one of a frontal, profile or upward/downward direction.

10. The method of claim 4, wherein a plurality of facial characteristics of at least one of the poses are respectively detected over a plurality of different cycles within respective set detection windows, and
    wherein the set detection windows overlap one another on the image in a predetermined manner, and
    wherein the method further comprises unifying the overlapping set detection windows into a single successful detection window.

11. The method of claim 10, wherein facial characteristics of the first and second poses are respectively detected within first and second successful detection windows, and
    wherein the first and second successful detection windows each comprise a set detection window or the successful detection window.

12. The method of claim 11, further comprising:
    determining the first and second successful detection windows overlap one another in an overlap region of the image.

13. The method of claim 12, wherein determining reliabilities comprises determining that a first reliability is greater than, equal to, or less than a second reliability,
    wherein the first and second reliabilities are determined from the amount of one or more set detection windows they each comprise.

14. The method of claim 13, wherein the first reliability is further determined from a first coefficient, the first coefficient increasing or decreasing the first reliability based on a preferred aspect of the first pose, and
    wherein the second reliability is further determined from a second coefficient, the second coefficient increasing or decreasing the second reliability based on a preferred aspect of the second pose.

15. The method of claim 14, wherein the first and second coefficients are further determined from the source of the image.

16. The method of claim 13, wherein the first reliability is determined to be equal to the second reliability, and
    wherein determining reliabilities further comprises determining that the first pose and second pose have the same or different profile directions, and
    wherein one of the different profile directions has a preferred reliability over the other.

17. The method of claim 16, wherein the profile directions are determined to be the same, and
    wherein determining reliability further comprises determining that the first pose and second pose have the same or different profile tilts, and
    wherein one of the different profile tilts has a preferred reliability over the other.

18. The method of claim 17, wherein the profile tilts are determined to be the same which results in a determination that the first and second poses are the same, and
    wherein the first and second successful detection windows are unified as a result.

19. A non-transitory computer readable storage medium comprising instructions which when executed by a processing system causes the processing system to perform the method of at least claim 1.

20. A processing system comprising a processor electronically coupled to the computer readable medium of at least claim 19.

* * * * *